(12) United States Patent
Tyagi et al.

(10) Patent No.: US 12,437,772 B2
(45) Date of Patent: Oct. 7, 2025

(54) METHODS, SYSTEMS, AND DEVICES FOR SPECTRALLY ADJUSTING AUDIO GAIN IN VIDEOCONFERENCE AND OTHER APPLICATIONS

(71) Applicant: Motorola Mobility LLC, Chicago, IL (US)

(72) Inventors: Vivek K Tyagi, Chicago, IL (US); Nikhil Ambha Madhusudhana, Chicago, IL (US); Kevin Villanueva, Chicago, IL (US); Chao Ma, Evanston, IL (US); Giles T Davis, Downers Grove, IL (US)

(73) Assignee: Motorola Mobility LLC, Chicago, IL (US)

( * ) Notice: Subject to any disclaimer, the term of this patent is extended or adjusted under 35 U.S.C. 154(b) by 391 days.

(21) Appl. No.: 17/881,355

(22) Filed: Aug. 4, 2022

(65) Prior Publication Data
US 2024/0046950 A1   Feb. 8, 2024

(51) Int. Cl.
| | |
|---|---|
| *G10L 21/034* | (2013.01) |
| *G06F 3/16* | (2006.01) |
| *G06T 7/70* | (2017.01) |
| *G10L 15/06* | (2013.01) |
| *G10L 15/25* | (2013.01) |
| *G10L 25/60* | (2013.01) |

(52) U.S. Cl.
CPC ............ *G10L 21/034* (2013.01); *G06F 3/167* (2013.01); *G06T 7/70* (2017.01); *G10L 15/063* (2013.01); *G10L 15/25* (2013.01); *G10L 25/60* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 7,457,426 B2 | 11/2008 | Drtina | |
| 10,798,514 B2 | 10/2020 | Reijniers et al. | |
| 11,257,511 B1* | 2/2022 | Peeler | G10L 25/57 |
| 2002/0090094 A1 | 7/2002 | Amir et al. | |
| 2006/0133623 A1 | 6/2006 | Amir et al. | |
| 2014/0337016 A1* | 11/2014 | Herbig | G10L 25/27 |
| | | | 704/201 |

(Continued)

OTHER PUBLICATIONS

Podder et al. "Design and Implementation of Butterworth, Chebyshev-I and Elliptic Filter for Speech Signal Analysis", Int. J. of Comp. App., 2014 (Year: 2014).*

(Continued)

*Primary Examiner* — Nicole A K Schmieder
(74) *Attorney, Agent, or Firm* — Philip H. Burrus, IV

(57) ABSTRACT

An electronic device includes an imager capturing one or more images of a subject engaging the electronic device and an audio input receiving acoustic signals having audible frequencies from the mouth of the subject engaging the electronic device. One or more processors determine from the one or more images of the subject whether the mouth of the subject is oriented on-axis relative to the audio input or off-axis relative to the audio input. The one or more processors adjust a gain of the audio input associated with a subset of the audible frequencies when the mouth of the subject is oriented off-axis relative to the audio input.

20 Claims, 15 Drawing Sheets

(56) References Cited

U.S. PATENT DOCUMENTS

| | | | | |
|---|---|---|---|---|
| 2014/0362253 | A1* | 12/2014 | Kim | H04N 5/262 367/119 |
| 2021/0327447 | A1* | 10/2021 | Maeng | H04R 3/005 |
| 2021/0337308 | A1* | 10/2021 | Kuthuru | H04M 3/568 |
| 2022/0182578 | A1* | 6/2022 | Sircar | G06V 40/165 |
| 2023/0071778 | A1* | 3/2023 | Du | G10L 21/18 |

OTHER PUBLICATIONS

"Directional Sound Definition", Wikipedia; Available online at https://en.wikipedia.org/wiki/Directional_sound ; As Published on and Viewed Jul. 15, 2022.

"Loudspeaker Facts: Directivity as a Design Issue Part 1", MC2 Design Group; Available online at http://www.mcsquared.com/speakers1.htm ; As published and Viewed online Jul. 15, 2022.

"Spatial Audio with Dolby Voice in BlueJeans Meeting", BlueJeans Product Features; Unknown Exact Publication Date but prior to filing of present application; viewed online at https://www.bluejeans.com/products/meetings/dolby-voice,.

"What is Auto Volume feature in Samsung Smart TV?", Product Detail; Published Oct. 13, 2020 at https://www.samsung.com/in/support/tv-audio-video/what-is-auto-volume-feature-in-samsung-smart-tv/.

"What is Directivity?", MC2 Design Group; Unknown Exact Publication Date; As viewed online at http://www.mcsquared.com/directvt.htm on Jul. 15, 2022.

Mark, "Microphones That Reduce Background Noise", Podcast How To; Published Apr. 18, 2022 online at https://www.podcasthowto.com/microphones-that-reduce-background-noise/.

Larson, James , "Understanding Loudspeaker Review Measurements Part 1", Audioholics—Online A/V Magazine; Published May 24, 2019; https://www.audioholics.com/loudspeaker-design/understanding-loudspeaker-measurements.

Levine, Mike , "The shape of things to come: Different types of microphones and when to use them", Available online at https://www.popsci.com/reviews/types-of-microphones/ ; Published Mar. 6, 2022.

Wightman, et al., "The Perception of Pitch", Published Mar.-Apr. 1974 in the American Scientist, vol. 62; pp. 208-215.

* cited by examiner

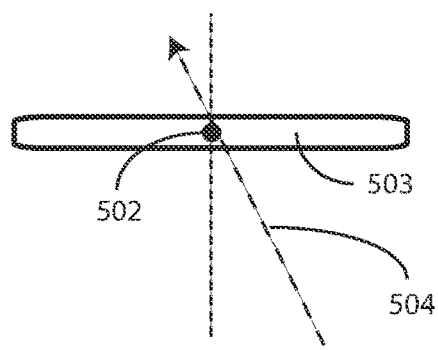
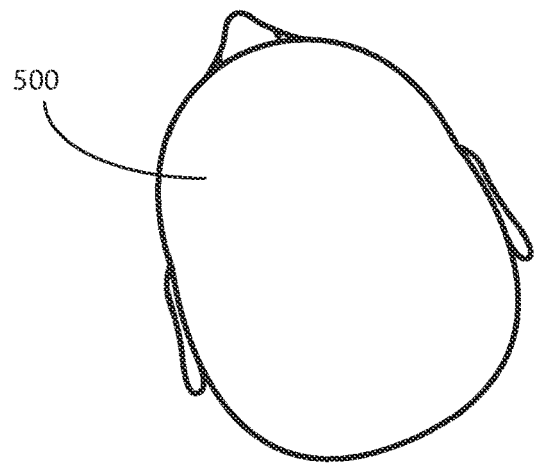
FIG. 10
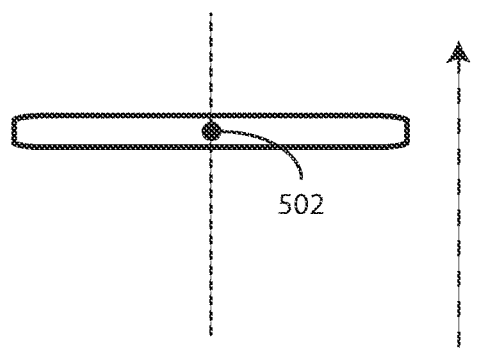
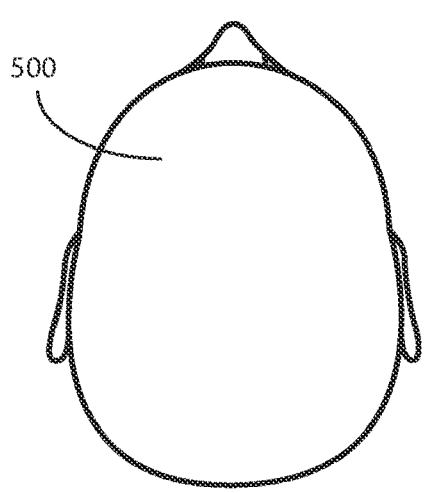
FIG. 11

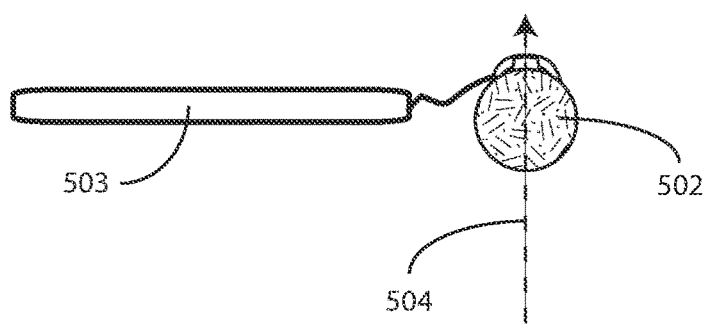
FIG. 12
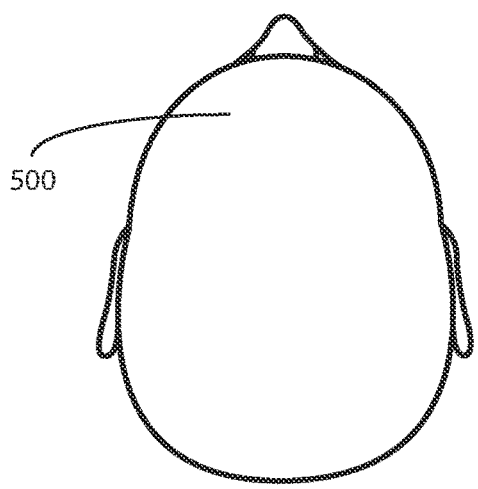
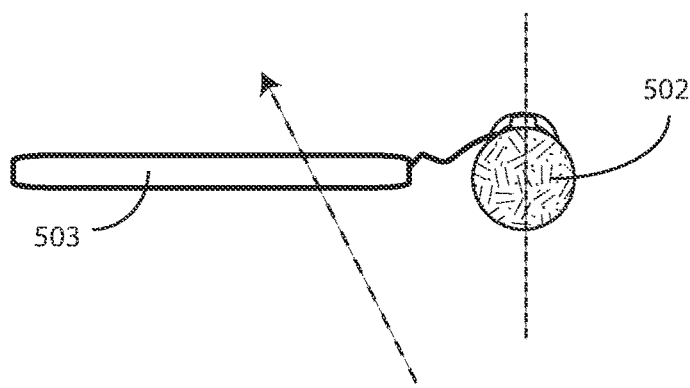
FIG. 13
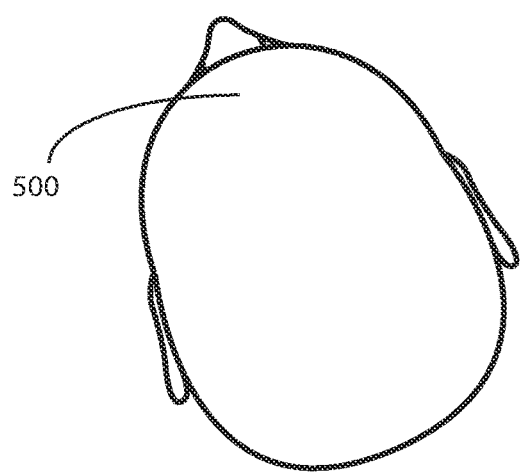

METHODS, SYSTEMS, AND DEVICES FOR SPECTRALLY ADJUSTING AUDIO GAIN IN VIDEOCONFERENCE AND OTHER APPLICATIONS

BACKGROUND

Technical Field

This disclosure relates generally to electronic devices, and more particularly to electronic communication devices having audio inputs capable of receiving acoustic signals having audible frequencies.

BACKGROUND ART

Many modern electronic devices, including smartphones, tablet computers, and laptop computers, are equipped to engage in videoconferences with other electronic devices across a network. Users frequently employ such devices to communicate with friends, family, and work colleagues. This is especially true during times of pandemic, when people work remotely rather than going to a centralized office. Participants engage videoconferencing to engage in real-time discussions and share electronic content. Videoconferencing additionally offers participants the ability to see other participants via video feeds streamed to the participating electronic devices.

During videoconferences, the audio quality can sometimes be less than optimal. This is especially true when participants become distracted and move away from the audio input. It would be advantageous to have improved electronic devices, methods, and systems to correct for inferior audio quality occurring during videoconferences and other similar applications.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

FIG. 10 illustrates the user of the electronic device oriented in another on-axis relationship with the audio input in accordance with one or more embodiments of the disclosure.

FIG. 11 illustrates the user of the electronic device oriented in another explanatory off-axis relationship with the audio input in accordance with one or more embodiments of the disclosure.

FIG. 12 illustrates a user of an electronic device paired with a companion electronic device, with the user in an on-axis relationship with an audio input of the companion electronic device in accordance with one or more embodiments of the disclosure.

FIG. 13 illustrates the user of the electronic device paired with the companion electronic device, with the user in an off-axis relationship with the audio input of the companion electronic device in accordance with one or more embodiments of the disclosure.

Figure 1:
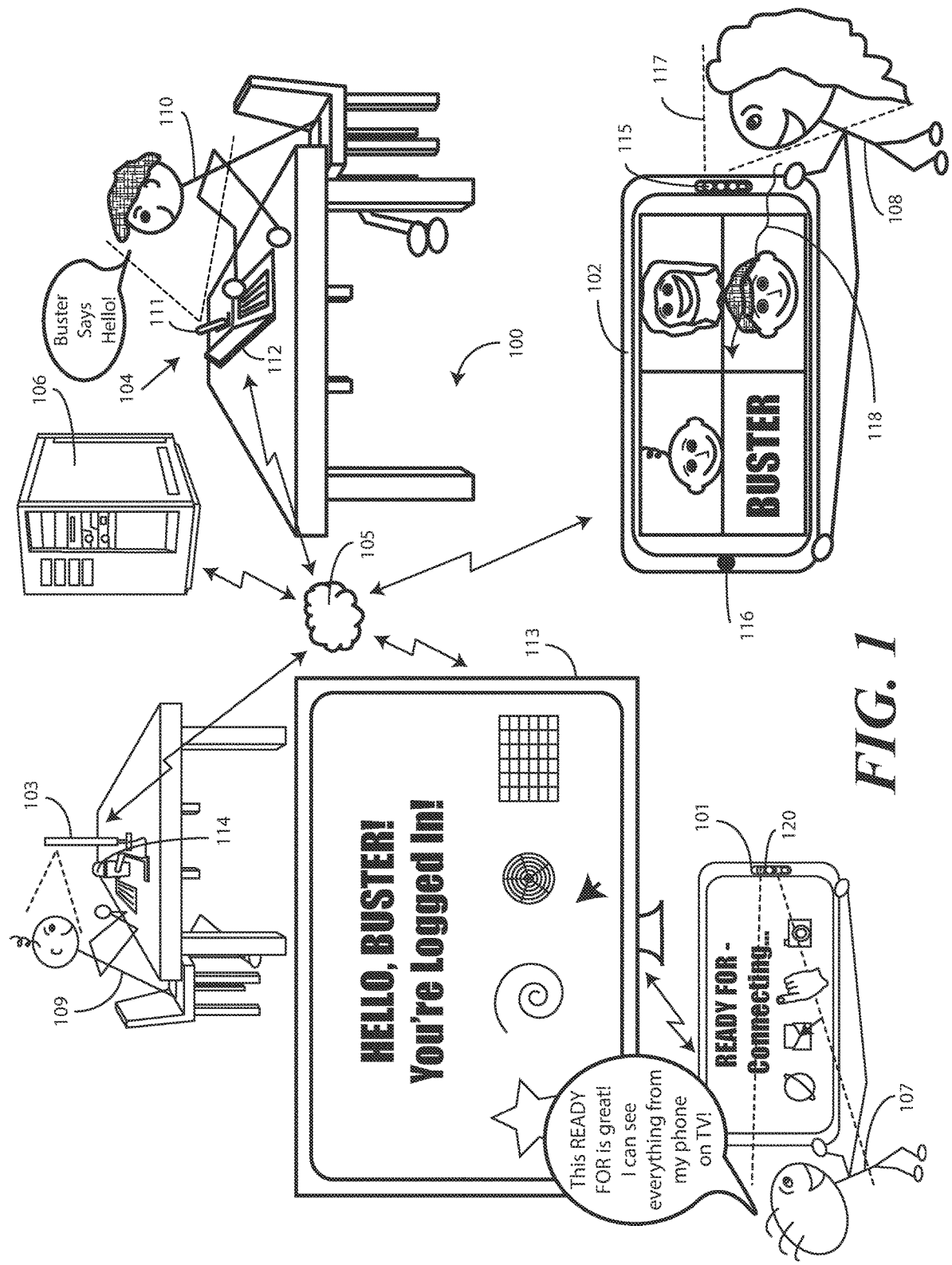
FIG. 1 illustrates one explanatory system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to adjusting a gain of audio input associated with a subset of audible frequencies when a mouth of a subject is oriented off-axis relative to an audio input of an electronic device. Any process descriptions or blocks in flow charts should be understood as representing modules, segments, or portions of code which include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of adjusting a gain of audio input for only a subset of audible frequencies when the mouth of a subject is oriented off-axis relative to an audio input of an electronic device as described herein. The non-processor circuits may include, but are not limited to, a radio receiver, a radio transmitter, signal drivers, clock circuits, power source circuits, and user input devices. As such, these functions may be interpreted as steps of a method to perform adjusting the gain of audio input for only the subset of frequencies when the off-axis relationship between mouth and audio input is detected.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Videoconferences and video "chats" are more popular than ever. Workers use videoconferences to work remotely, students use videoconferences to learn remotely, and the general public uses videoconferences to keep in touch with friends and family. The explosion in the use of videoconferences was accelerated by the SARS-CoV-2 pandemic. When people could not congregate collectively, they began using videoconferences for everything from work to school to gaming to family get togethers. When millions of companies shifted to fully remote working conditions in a short period of time to slow the spread of the Coronavirus Disease 2019, videoconferencing became the logical solution for connecting the remote workforce and keeping teams productive from home.

Some studies even suggest that while a majority of Americans routinely use videoconferences during the SARS-CoV-2 pandemic, over a third of those users had never used a videoconferencing platform prior to the pandemic occurring. Now videoconferencing seems to permeate nearly all aspects of professional and personal life. In addition to business-related meetings, remote teams around the globe use video conferencing to host virtual happy hours, ice breaker activities, online games, wine tastings, birthday parties, and other social activities. People of all walks of life now use videoconferences and video chats to communicate with friends, family, and work colleagues due to the high quality of videoconference applications and services and the convenience of the same.

While videoconferencing technology generally works well, issues can still arise due to technological limitations. For instance, when a videoconferencing device, such as a laptop computer, tablet computer, smartphone, or desktop computer, is fixed in three-dimensional space relative to a moving user, the audio associated with videoconference communications is not always optimal. Said differently, depending upon the relationship of speaker and microphone the output volume of videoconferencing calls is not always optimal. This is especially true when participants of the calls are distracted or have moved away from the audio input of the videoconferencing device.

To illustrate by example, consider the scenario of an instructional-based event such as an on-line yoga class where the instructor and student are communicating via videoconference. If the instructor does not remain near the microphone or audio input, details being conveyed to the student can be missed. This is especially true when the audio input is a condenser microphone with a cardioid polar pattern that is highly unidirectional and picks up more sound from the front than from the rear or sides. If the student or instructor becomes distracted or moves out of the frame or is not facing the audio input, audio quality can suffer.

Embodiments of the disclosure advantageously solve this problem by adjusting the gain of audio input when the mouth of a subject is visually detected to be oriented off-axis relative to the audio input of an electronic device. Moreover, rather than adjusting the gain of all audible frequencies associated with the acoustic signals received by the audio input, embodiments of the disclosure instead spectrally adjust the gain of the audio input for only a subset of audible frequencies. Said differently, embodiments of the disclosure adjust a gain of the audio input associated with a subset of the audible frequencies of the acoustic signals received by the audio input when the mouth of the subject is oriented off-axis relative to the audio input. In one or more embodiments, the subset of the audible frequencies is between one thousand and ten thousand Hertz. In one or more embodiments, the subset of the audible frequencies is between one thousand and five thousand Hertz. In one or more embodiments, the gain of these frequencies is adjusted by at least five decibels (dB).

Embodiments of the disclosure spectrally adjust the gain for this midrange subset of frequencies to specifically avoid adjusting the gain associated with low end (frequencies between one hundred Hertz and one thousand Hertz) and high end (frequencies above five or ten thousand Hertz) because these midrange frequencies are associated with speech intelligibility, which occurs generally in a range of between one thousand and four thousand Hertz. In contrast to prior art systems that adjust the overall volume, embodiments of the disclosure spectrally adjust only the midrange frequencies associated with speech, thereby improving overall intelligibility of speakers speaking during videoconferences and other similar sessions.

Applying gain to only a midrange set of frequencies, one example of which is one thousand to four thousand Hertz, advantageously offers a significant and meaningful difference in contrast to prior art systems. Embodiments of the disclosure contemplate that when a speaker turns their head, the response below one thousand Hertz is not attenuated. Accordingly, applying gain to frequencies in the full audible spectrum (one hundred Hertz to twenty thousand Hertz) is non-ideal in that it amplifies the lower frequencies relative to the higher frequencies. Advantageously, applying the gain to only a subset of the audible frequencies is less noticeable to the end user. In short, embodiments of the disclosure work to improve intelligibility without calling attention to the fact that a gain adjustment is occurring.

In one or more embodiments, an electronic device comprises an imager capturing one or more images of a subject engaging the electronic device, such as when the subject engages the electronic device during a videoconference. In one or more embodiments, the electronic device comprises an audio input receiving acoustic signals having audible frequencies from the mouth of the subject engaging the electronic device.

In one or more embodiments, the electronic device comprises one or more processors determining from the one or more images of the subject whether the mouth of the subject is oriented on-axis relative to the audio input or off-axis relative to the audio input. In one or more embodiments, the one or more processors adjust a gain of the audio input associated with a subset of the audible frequencies when the mouth of the subject is oriented off-axis relative to the audio input.

Advantageously, embodiments of the disclosure solve problems when a speaker in a videoconference is distracted and is therefore not speaking directly into the microphone or other audio input. Rather than resulting in a lower received volume that affects the quality and volume of sound for the listener, embodiments of the disclosure spectrally apply a gain to the audio input for only a subset of audible frequencies associated with acoustic signals received by the audio input so that the listener can hear well regardless of whether the speaker is speaking directly into the microphone or other audio input or not. If the speaker moves out of the frame or otherwise becomes oriented off-axis relative to the microphone or audio input, embodiments of the disclosure adjust a gain of the audio input associated with a subset of the audible frequencies when the mouth of the subject is oriented off-axis relative to the audio input.

Embodiments of the disclosure work regardless of whether the audio input is fixedly situated in the electronic device, e.g., the internal microphone of a laptop computer, or is configured as a companion electronic device, e.g., as a microphone accessory coupled to the laptop computer wirelessly or by a wire. Moreover, embodiments of the disclosure include training methods where acoustic signals are received when the mouth of the user is oriented both on-axis and off-axis to calculate vectors to determine the location of the audio input when the audio input is configured as a companion electronic device. Other features and benefits will be described below. Still others will be obvious to those of ordinary skill in the art having the benefit of this disclosure.

Turning now to FIG. 1, illustrated therein is one explanatory videoconference system 100 in accordance with one or more embodiments of the disclosure. As shown, multiple participants 107,108,109,110 each employ their own respective electronic device, e.g., electronic devices 101,102,103, to engage with the other participants via the videoconference.

In this illustrative embodiment, electronic devices 101, 102 are shown as smartphones, while electronic device 103 is shown as a desktop computer. While this system provides one explanatory configuration of electronic devices engaged in a videoconference, electronic devices suitable for use in the videoconference system can take other forms as well. For instance, tablet computers, notebook computers, audio-visual devices, mobile phones, smart watches, or other devices can be used by participants to engage in the videoconference as well. Other examples of electronic devices will be obvious to those of ordinary skill in the art having the benefit of this disclosure.

Participant 108 is using a single device, i.e., electronic device 102, to engage in the videoconference. Accordingly, the imager 115 capturing one or more images 117 of participant 108 and the audio input 116 receiving acoustic signals 118 from the mouth of participant 108 having audible frequencies are in the same device and are at fixed, known locations relative to each other. By contrast, participants 107,109,110 are each using hybrid systems where the audio input and the imager are in separate devices.

By way of example, participant 107 is using a companion electronic device 113 as an auxiliary display for his electronic device 101. The companion electronic device 113 includes an audio input 114. This means that the imager 120 capturing one or more images of participant 107, which is situated in the smartphone, is physically separate from the audio input, which is situated in the companion electronic device 113. Similarly, participant 109 is using an external microphone 114 as an audio input for the desktop computer for increased audio quality and decreased background noise. The external microphone 114 is an audio only device, which means that the imager capturing one or more images of participant 109 is situated in a separate, physically different device embodied by the desktop computer.

Participant 110 is also using a hybrid system where his tablet computer 111 is serving as a "webcam" for his laptop computer 112, which is serving as a primary display device, and which includes the audio input being used in the videoconference. Said differently, the tablet computer 111 is acting as the image capture device for the hybrid system, while the laptop computer 112 operates as a content presentation companion device serving as a primary display for the tablet computer 111, as well as an audio input device. By doing this, participant 110 leverages the incredibly high quality of the image capture device built into his tablet computer 111 while viewing images captured by this image capture device, as well as image content received from the other electronic devices 101,102,103 across the network 105, on the larger display of the laptop computer 112. Since the laptop computer 112 has the closer microphone, participant 110 uses the physically separate microphone as an audio input for the hybrid system.

As shown in FIG. 1 each electronic device is engaged in wired or wireless communication with each other across a network 105, one example of which is the Internet via the World Wide Web. It should be noted that the network 105 could be a public, private, local area, wide area, or other type of network across which wired or wireless electronic communications can be exchanged.

In this illustrative embodiment, each electronic device is also in communication with a video conferencing system server complex 106 across the network 105. In one or more embodiments video conferencing system server complex 106 includes components such as a web server, a database server, an audio server, and optionally a video server (the video server may be omitted for audio only conferencing systems) that are operable to facilitate videoconferences between the various electronic devices of the videoconference system.

These components of the video conferencing system server complex 106 can be combined on the same server. Alternatively, these components can be distributed on any number of servers to increase load handling capacity beyond that of a single server, and so forth. Other configurations for the video conferencing system server complex 106 will be obvious to those of ordinary skill in the art having the benefit of this disclosure.

In one or more embodiments, the video conferencing system server complex 106 performs functions such as maintaining a schedule of videoconferences, maintaining lists of participants, as well as allowing each participant's electronic device to engage with the videoconference, and so forth. In one or more embodiments, the video conferencing system server complex 106 also facilitates the transmission of audio and video content during the occurrence of the videoconference.

In one or more embodiments, the video conferencing system server complex 106 functions as an intermediary device to facilitate sharing of audio and/or video content and/or data between the various electronic devices. For example, as can be seen on the displays of electronic device 102, in this example participant 108 can see each other participant engaged in the videoconference.

In the illustrative example of FIG. 1, as can be seen on the display of electronic device 102, participants 108,109,110 are engaged in the videoconference. Participant 107 is in the process of pairing the companion electronic device 113 with his electronic device 101. Once paired, participant 107 will also join the videoconference. In FIG. 1, the electronic device 101 and the companion electronic device 113 operate in tandem as a system, with the electronic device 101 providing the processing power while the companion electronic device 113 serves as both an auxiliary display device for the electronic device 101 and as an audio capture device.

As shown in FIG. 1, electronic device 101 is electronically in communication with the companion electronic device 113. When the electronic device 101 is electronically in communication with the companion electronic device 113, this allows the electronic device 101 to use the larger display of the companion electronic device 113 to present content. Illustrating by example, in one or more embodiments the electronic device 101 can operate in a "content redirection" mode by presenting content such as movies, videos, videoconferences, images, and even a traditional computer user interface, on the display of the companion electronic device 113. The hybrid system being used by participant 110 functions in a similar manner.

Embodiments of the disclosure contemplate that with the advanced computing power available in smartphones and other electronic devices, users often consume movies, videos, television shows, and other content, including videoconference content, using these devices. By establishing an electronic communication channel between the electronic device 101 and the companion electronic device 113, the processing power of the electronic device 101 can be leveraged to present content on the display of the companion electronic device 113. This allows videoconference participant 107 to use the display of the companion electronic device 113 to engage in the videoconference of FIG. 1. Participant 110 similarly uses the display of the laptop computer 112 for the presentation of images captured by the tablet computer 111.

Since the participants 108,109,110 are all engaged in a videoconference, each can see conference content in the form of a combined video feed from each other participant 108,109,110 presented on the display of each electronic device, as well as a video feed of themselves. Under ordinary conditions, each participant 108,109,110 can hear an audio feed from each other participant 108,109,110 as well.

In this illustrative embodiment, participant 110 is acting as a presenter, and is speaking, noting that a friend, Buster, "says hello." This means that participant 110 is delivering acoustic signals having audible frequencies to the audio input of the laptop computer 112 while the imager of the tablet computer 111 captures images of participant 110 while speaking. The one or more images of participant 110 can be captured in the form of video, still images, or combinations of the two. Either the tablet computer 111 or the laptop computer 112 can optionally transmit this video and audio of the presenter to the other electronic devices 101,102,103 via the video conferencing system server complex 106. While participant 110 is the presenter at the moment, it is to be understood that the presenter role can be changed throughout the videoconference as well, with each other participant 107,108,109 taking the role of presenter at other times as situations warrant.

Figure 2:
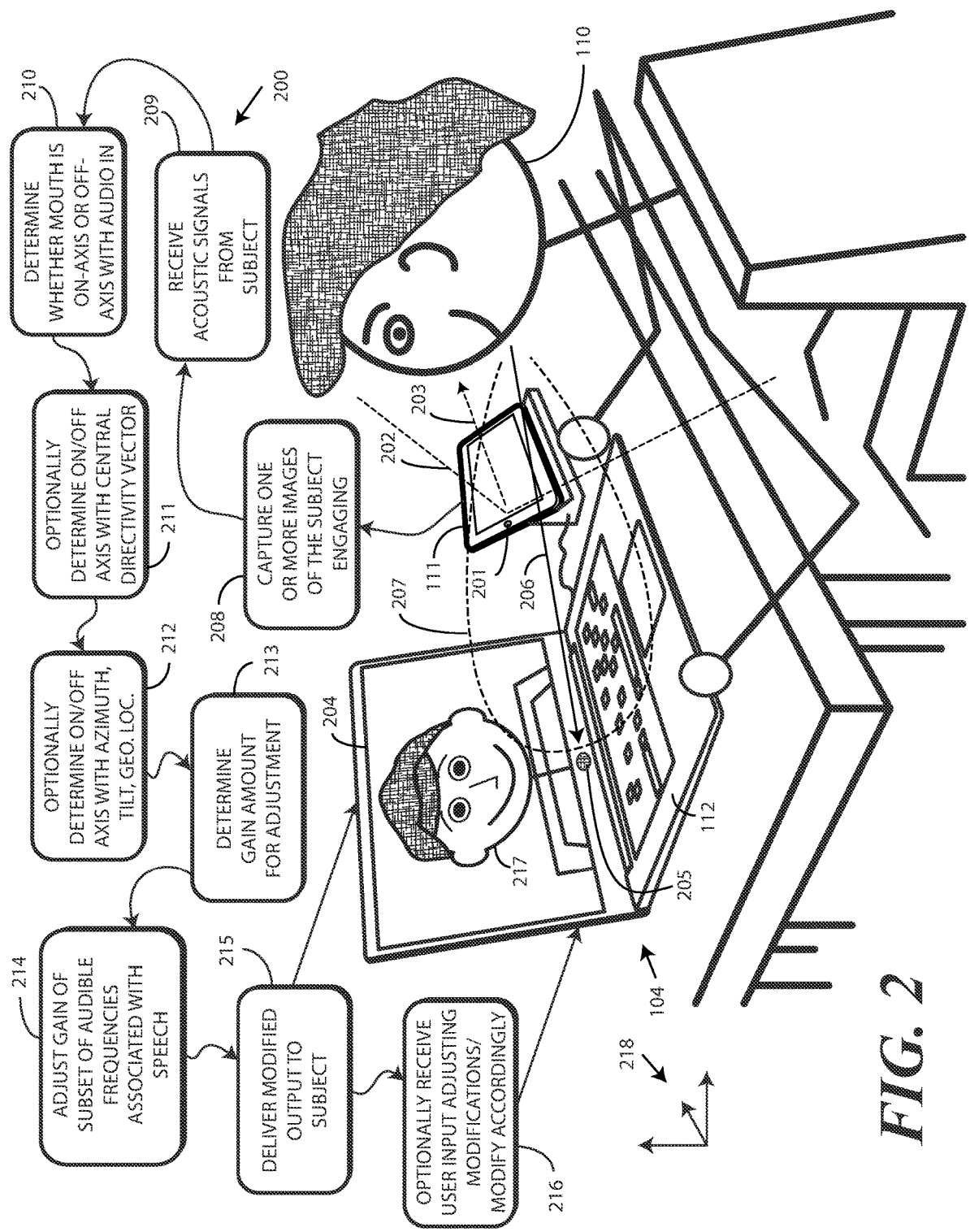
FIG. 2 illustrates one explanatory electronic device operating with a companion electronic device, along with one or more method steps, in accordance with one or more embodiments of the disclosure.

One of the hybrid systems where an electronic device and companion electronic device work in tandem is shown in more detail along with an explanatory method configured in accordance with one or more embodiments of the disclosure in FIG. 2. Turning now to FIG. 2, the tablet computer 111 and laptop computer 112 of hybrid system 104 can more readily be seen.

As shown, the tablet computer 111 is in a docked configuration in that it has been coupled to a docking station that is electrically coupled to the laptop computer 112. In this illustrative embodiment, the docking station includes one or more electrical contacts that couple to complementary electrical contacts in the tablet computer 111 so that signals from the tablet computer 111, including signals transmitting one or more images 203 captured by an image capture device 201 of the tablet computer 111, can be transmitted to the laptop computer 112 through an electrical connection coupling the docking station to the laptop computer 112. One example of such an electrical connection is that of a wire.

In other embodiments, rather than including electrical contacts, the docking station will include a wireless communication circuit configured to communicate wirelessly with the tablet computer 111. Similarly, the wireless communication circuit of the docking station can be configured to communicate with the laptop computer 112 wirelessly as well. In still other embodiments, the docking station will be a mechanical docking station only, supporting the tablet computer 111 in an orientation in three-dimensional space where the image capture device has its field of view 202 directed toward the participant 110 using the hybrid system 104, with a communication device of the tablet computer 111 communicating wirelessly with the laptop computer 112 directly. Other examples of docking stations and docking station configurations will be obvious to those of ordinary skill in the art having the benefit of this disclosure.

In the illustrative example of FIG. 2, the image capture device 201 of the tablet computer 111 sits in the docking station with its field of view 202 directed toward participant 110. The image capture device 201 is capturing one or more images 203 of participant 110, which are being delivered to the laptop computer 112 for presentation on the display 204 of the laptop computer 112.

Meanwhile, the laptop computer 112 includes an audio input 205, which in this example is a single microphone. In this illustration, the audio input 205 is positioned beneath the display 204 of the laptop computer 112, although it can be located in other locations as well. Regardless of where it is located, the audio input 205 is situated in a fixed location along the housing of the laptop computer 112 in this illustrative embodiment.

Accordingly, the image capture device 201 of the hybrid system 104 and the audio input 205 of the hybrid system 104 are situated in physically separate devices. As will be described in more detail below with reference to FIG. 18, a training process can be used prior to the commencement of the videoconference so that the one or more processors performing the method steps shown in FIG. 2 can determine the location of either the image capture device 201 or the audio input 205. If, for example, the one or more processors of the laptop computer 112 are performing the method steps, the training process can allow the one or more processors of the laptop computer 112 to determine where the image capture device 201 is in relation to the laptop computer 112. By contrast, if the one or more processors of the tablet computer 111 are executing the method steps, the training process can allow the one or more processors of the tablet computer 111 to determine where the audio input 205 is in relation to the tablet computer 111.

In this illustrative embodiment, participant 110 is looking at the display 204 of the laptop computer 112 where a depiction 217 of participant 110 is presented. Accordingly, the mouth of participant 110 is oriented "on-axis" with the audio input 205. As used herein, "on-axis" means that a central directivity vector 206 of an acoustic polar pattern 207 is oriented toward the audio input 205. Much like a loudspeaker, when a person speaks their voice emanates with a directivity that can be represented by an acoustic polar pattern 207 defining the directions in which the sound propagates. The central directivity vector 206 defines in which way the central portion of this acoustic polar pattern 207 is directed. In FIG. 2, the central directivity vector 206 running from the mouth of participant 110 is oriented directly toward the audio input 205. Accordingly, the mouth is oriented on-axis relative to the audio input 205.

By contrast, the mouth of participant 110 would be oriented "off-axis" relative to the audio input 205 if the central directivity vector 206 was pointed in a direction other than at the audio input 205. Illustrating by example, if participant 110 turned their head to look at the image capture device 201 of the tablet computer 111, this would result in the mouth being oriented off-axis relative to the audio input 205.

To illustrate the concept of on-axis and off-axis more clearly, FIGS. 5-13 depict some on-axis and off-axis examples. Beginning with FIGS. 5A-B, illustrated therein is a clearer depiction of an on-axis relationship between the mouth 501 of a subject 500 and the audio input 502 of an electronic device 503. As shown in FIG. 5A, the central directivity vector 504 runs directly from the mouth 501 of the subject 500 through the audio input 502 of the electronic device 503. Similarly, as shown in FIG. 5B, there is a straight-line relationship between the mouth (501) and audio input 502 of the electronic device 503 due to the fact that the subject 500 has their head positioned directly in front of the electronic device 503.

Figure 5A:
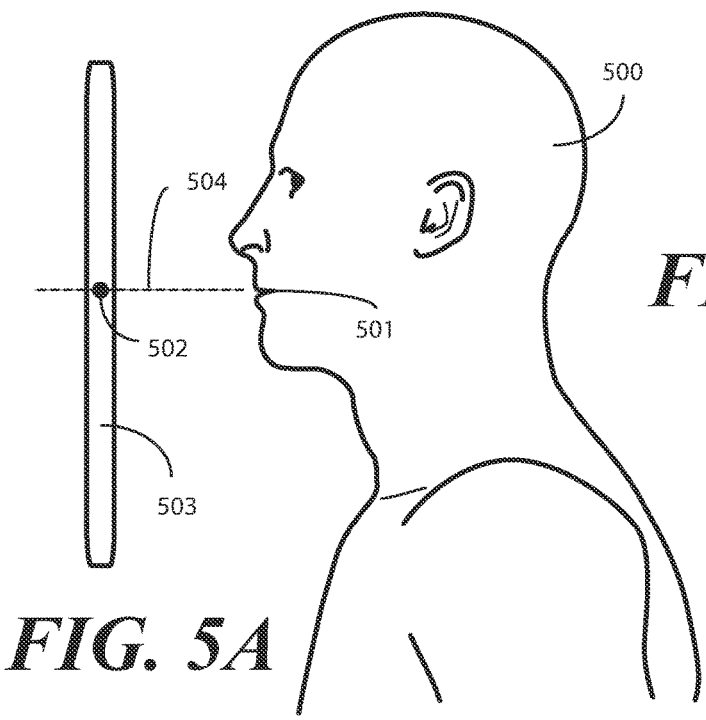
FIGS. 5A and 5B illustrates a user of an electronic device oriented on-axis relative to an audio input of the electronic device in accordance with one or more embodiments of the disclosure.
Figure 5B:
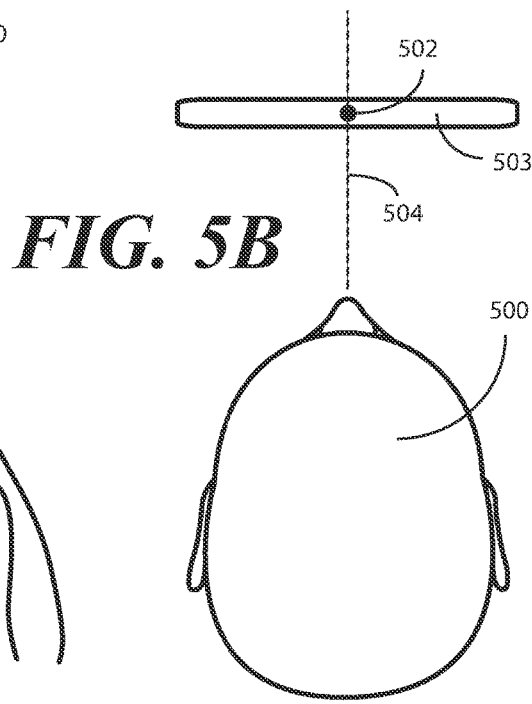

In the illustrative embodiment of FIGS. 5A-5B, the on-axis relationship exists when the central directivity vector 504 is oriented orthogonally relative to a major face of the electronic device 503 with the elevation of the mouth 501 being equal to the elevation of the audio input 502, and with the lateral position of the mouth 501 being equal to the lateral position of the audio input 502. As will be shown in subsequent figures, this need not always be true for an on-axis relationship to exist.

Figure 6:
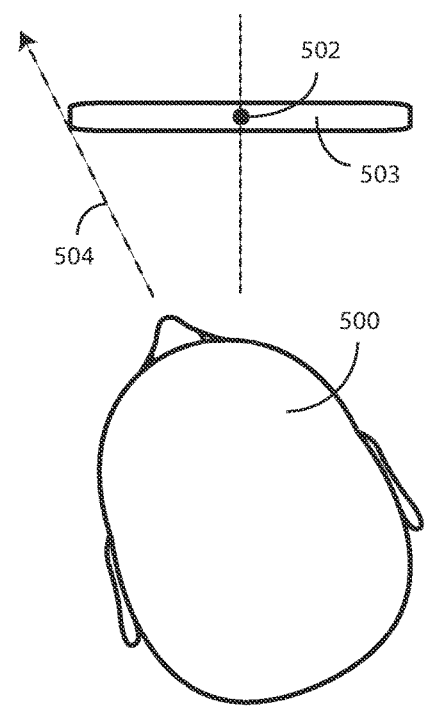
FIG. 6 illustrates the user of the electronic device oriented in one explanatory off-axis relationship relative to the audio input in accordance with one or more embodiments of the disclosure.

By contrast, turning to FIG. 6, the subject 500 has turned the head to the left. This results in the mouth (501) being off-axis relative to the audio input 502 of the electronic device 503. This is true because the central directivity vector 504 is no longer directed toward the audio input 502. Since the acoustic signals delivered by the subject 500 have associated therewith an acoustic polar pattern that is directional, this means that the volume associated with speech carried by those acoustic signals—as detected by the audio input 502—are reduced. As noted above, bass frequencies under one thousand Hertz are generally unaffected. However, speech within a subset of the audible frequencies associated with the acoustic signals will be diminished.

Figure 7:
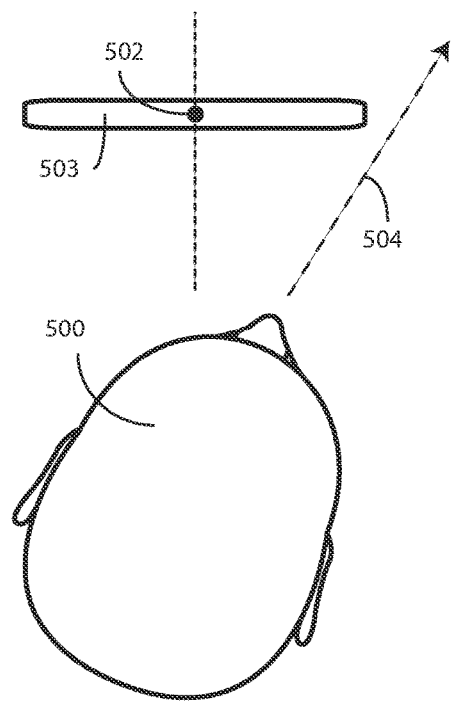
FIG. 7 illustrates the user of the electronic device oriented in another explanatory off-axis relationship relative to the audio input in accordance with one or more embodiments of the disclosure.

Similarly, turning now to FIG. 7 the subject 500 has turned the head to the right. This results in the mouth (501) being off-axis relative to the audio input 502 of the electronic device 503. This is true because the central directivity vector 504 is no longer directed toward the audio input 502. This is also true despite the fact that the mouth (501) and audio input 502 remain at the same elevation as shown in FIG. 5A. Since the acoustic signals delivered by the subject 500 have associated therewith an acoustic polar pattern that is directional, this means that the volume associated with speech (between one thousand and four thousand Hertz) carried by those acoustic signals—as detected by the audio input 502—are reduced.

Figure 8:
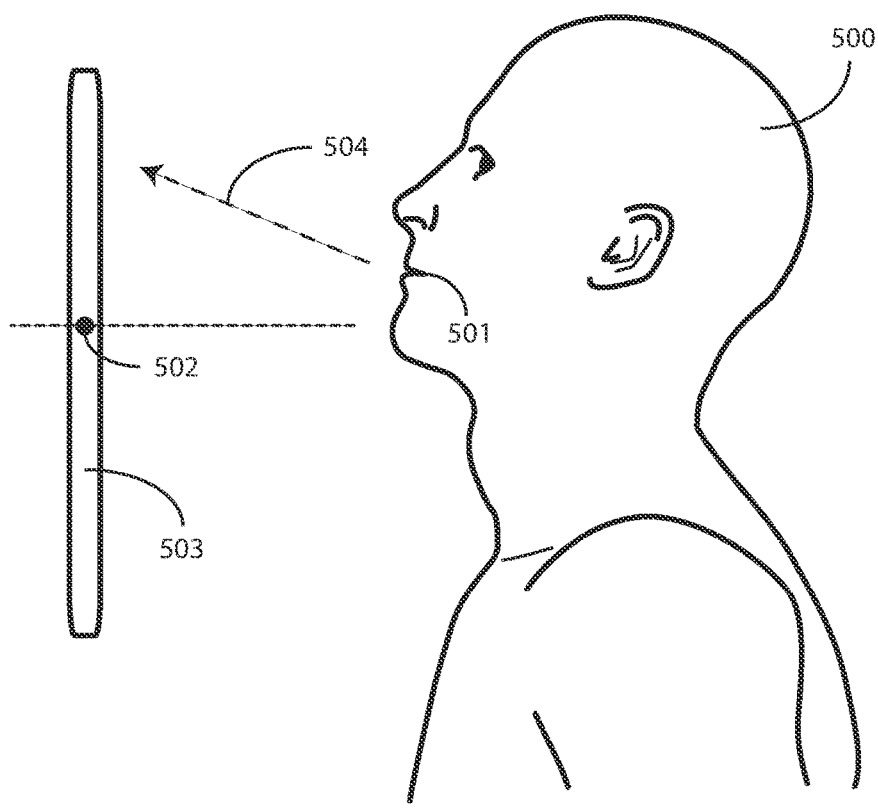
FIG. 8 illustrates the user of the electronic device oriented in still another explanatory off-axis relationship relative to the audio input in accordance with one or more embodiments of the disclosure.

Turning now to FIG. 8 the subject 500 has turned the head upward. This results in the mouth 501 being off-axis relative to the audio input 502 of the electronic device 503. This is true because the central directivity vector 504 is no longer directed toward the audio input 502 due to the fact that the subject 500 has changed not only the direction, but also the elevation, of the mouth 501 in three-dimensional space. Since the acoustic signals delivered by the subject 500 have associated therewith an acoustic polar pattern that is directional, this means that the volume associated with speech (between one thousand and four thousand Hertz) carried by those acoustic signals—as detected by the audio input 502—are reduced.

Figure 9:
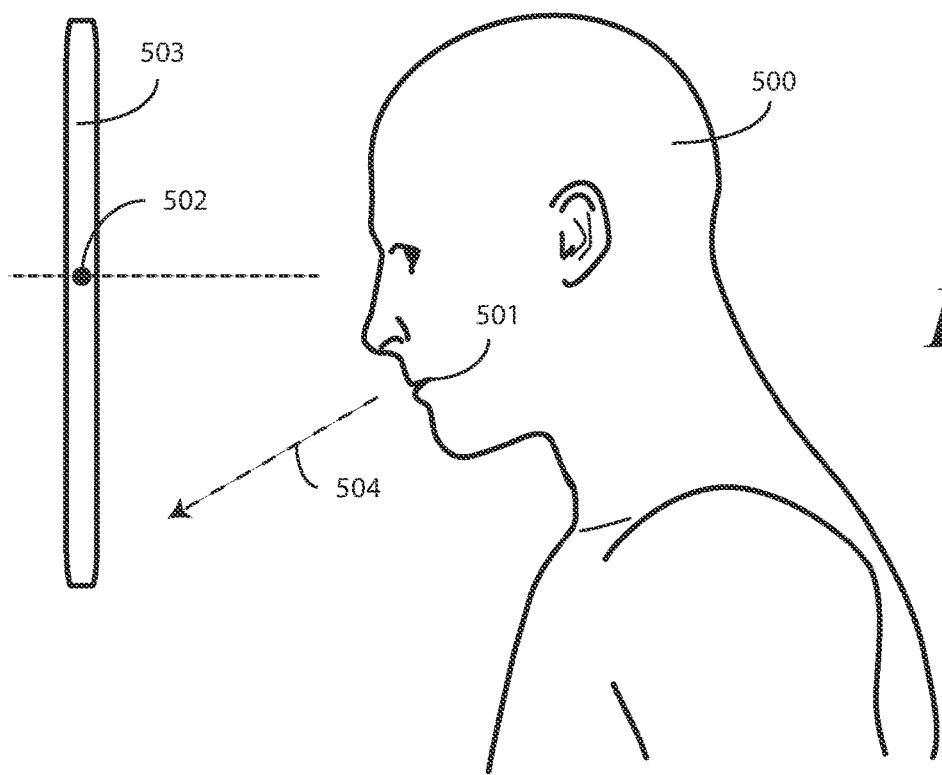
FIG. 9 illustrates the user of the electronic device oriented in yet another explanatory off-axis relationship with the audio input in accordance with one or more embodiments of the disclosure.

The same is true in FIG. 9, where the subject 500 has turned the head downward. This results in the mouth 501 being off-axis relative to the audio input 502 of the electronic device 503, as the central directivity vector 504 is no longer directed toward the audio input 502. The subject 500 has changed not only the direction, but also the elevation, of the mouth 501 in three-dimensional space, thereby causing the volume associated with speech (between one thousand and four thousand Hertz) carried by those acoustic signals—as detected by the audio input 502—are reduced.

Turning now to FIG. 10, the subject 500 has changed the lateral position of the head relative to the electronic device 503. However, the subject 500 is looking to the left, thereby causing the central directivity vector 504 to extend through the audio input 502 of the electronic device 500. This results in an on-axis relationship between the mouth (501) of the subject 500 and the audio input 502. By contrast, in FIG. 11 where the subject 500 looks forward, an off-axis relationship between the mouth (501) and the audio input 502 is created.

In FIG. 11, a hybrid system is being used where the audio input 502 is in a physically separate device from the electronic device 503. Here, the audio input 502 is configured as an external microphone. Accordingly, despite the fact that the head of the subject 500 is not aligned with a normal axis from the front major surface of the electronic device 503, an on-axis relationship exists between the audio input 502 and the mouth (501) due to the fact that the central directivity vector 504 is directed through the audio input 502. When the subject looks back to the electronic device 503 by turning the head, as shown in FIG. 12, an off-axis relationship exists despite lateral alignment of the head and audio input 502 in three-dimensional space.

Embodiments of the disclosure contemplate that a switch between an on-axis and off-axis relationship can occur a lot during a videoconference. A speaker can become distracted and may not speak directly into their microphone. This may result in lower speech volumes being received by an audio input, thereby adversely affecting the quality of sound heard by a listener. This may result in missed details of conversation and other inconveniences.

Similarly, if a user moves "out of the frame" as shown in FIG. 10, the regular set gain of the audio input may not be loud enough for listeners to pay full attention. This, again, may result in missed details and other inconveniences, as evidenced by the example above of the on-line yoga class where the instructor and student are communicating via videoconference. If the instructor does not remain near the microphone or audio input, which can frequently happen when demonstrating yoga poses, details being conveyed to the student can be missed. This is especially true when the audio input is a condenser or other type of microphone with a highly directional cardioid polar pattern. If the student or instructor becomes distracted or moves out of the frame or is not facing the audio input, audio quality can suffer.

Turning now back to FIG. 2, embodiments of the disclosure advantageously solve this problem by adjusting the gain of audio input 205 when the mouth of participant 110 is visually detected to be oriented off-axis relative to the audio input 205 of the laptop computer 112. As described above, rather than adjusting the gain of all audible frequencies associated with the acoustic signals carried in the acoustic polar pattern 207 that are received by the audio input 205, which may range from one hundred Hertz to between ten thousand and twenty thousand Hertz, embodiments of the disclosure instead spectrally adjust the gain of the audio input 205 for only a subset of the audible frequencies. In one or more embodiments, one or more processors of the laptop computer 112 or of the tablet computer 111, depending upon which is executing the method steps of FIG. 2, spectrally adjust a gain of the audio input 205 associated with a subset of the audible frequencies of the acoustic signals received by the audio input 205 when the mouth of participant 110 is oriented off-axis relative to the audio input 205.

In one or more embodiments, the subset of the audible frequencies is between one thousand and ten thousand Hertz. In one or more embodiments, the subset of the audible frequencies is between one thousand and five thousand Hertz. In one or more embodiments, the gain of these frequencies is adjusted by at least five decibels (dB).

As noted above, embodiments of the disclosure spectrally adjust the gain of the audio input 205 for this midrange subset of frequencies to specifically avoid adjusting another gain associated with low end (frequencies between one hundred Hertz and one thousand Hertz) or high end (frequencies above five or ten thousand Hertz) because these midrange frequencies are associated with speech intelligibility. The sibilance of consonants generally emanate from a mouth with a range of between one thousand and four thousand Hertz, with a center frequency of around two thousand Hertz. Applying gain covering one octave above and below this center frequency results in a range of between about one thousand and four thousand Hertz. In contrast to prior art systems that adjust the volume of the entire acoustic spectrum, embodiments of the disclosure spectrally adjust only the midrange frequencies associated with speech, thereby improving overall intelligibility of speakers speaking during videoconferences and other similar sessions.

To do this, one or more processors of the tablet computer 111 or laptop computer 112, depending upon which one is in control, execute a method 200 in accordance with one or more embodiments of the disclosure. Beginning at step 208, the image capture device 201 of the tablet computer 111 captures one or more images 203 of participant 110 while participant 110 is engaging the tablet computer 111 in the videoconference.

At step 209, the audio input 205 of the laptop computer 112 receives acoustic signals represented by the acoustic polar pattern 207. These acoustic signals have associated therewith audible frequencies. The audio input 205 receives the acoustic signals from the mouth of participant 110 while participant 110 engages the laptop computer 112.

At step 210, one or more processors of one or both of the one or more processors of the laptop computer 112 and/or one or more processors of the tablet computer 111 (since this is a hybrid system either or both can be in control) visually determine from the one or more images 203 of participant 110 whether the mouth of participant 110 is oriented on-axis relative to the audio input 205 or off-axis relative to the audio input 205. The one or more processors can do this by performing an image analysis of depictions 217 of participant 110 to determine whether the central directivity vector 206 associated with the acoustic polar pattern 207 is oriented toward the audio input 205 in one or more embodiments, as shown at step 211.

Alternatively, or in combination with step 210, at step 212 the one or more processors can determine whether the mouth of participant 110 is oriented on-axis relative to the audio input 205 or off-axis relative to the audio input 205 by determining an azimuth of the head of participant 110 relative to the electronic device with the audio input 205, here the laptop computer 112, a tilt of the head of participant 110 relative to the laptop computer 112, and a geometric location of the head of participant relative to the laptop computer 112. Examples of how this can be done augmented reality described below with reference to FIGS. 19-20.

In one or more embodiments, steps 210,211,212 can include artificial intelligence based subject tracking utilizing a subject tracking procedure to identify depictions of a subject in the one or more images 203 being captured by the image capture device 201. Where employed, the artificial intelligence based subject tracking can then track the subject based upon several factors. Accordingly, when the subject moves within the one or more images 203, the one or more processors can detect the same to determine whether the mouth is still in an on-axis or off-axis orientation with the audio input 205. The artificial intelligence based subject tracking may utilize facial geometry of the subject as one of round vs elongated to determine the orientation of the head in three-dimensional space 218, and so forth.

At step 213, the one or more processors determine an amount of gain adjustment that should be applied as a function of the location of the mouth of participant 110 and the audio input 205. In one or more embodiments, this gain is at least five decibels when the central directivity vector 206 associated with the acoustic polar pattern 207 is oriented off-axis relative to the audio input 205.

The one or more processors then adjust a gain of the audio input 205 associated with a subset of the audible frequencies when the mouth of participant 110 is oriented off-axis relative to the audio input 205 at step 214. In one or more embodiments the gain is adjusted by at least five decibels between one thousand and five thousand Hertz. The modified output can then be delivered to participant 110 at step 215, with the method repeating at step 216 as the relationship between the mouth of participant 110 and the audio input 205 changes.

Figure 3:
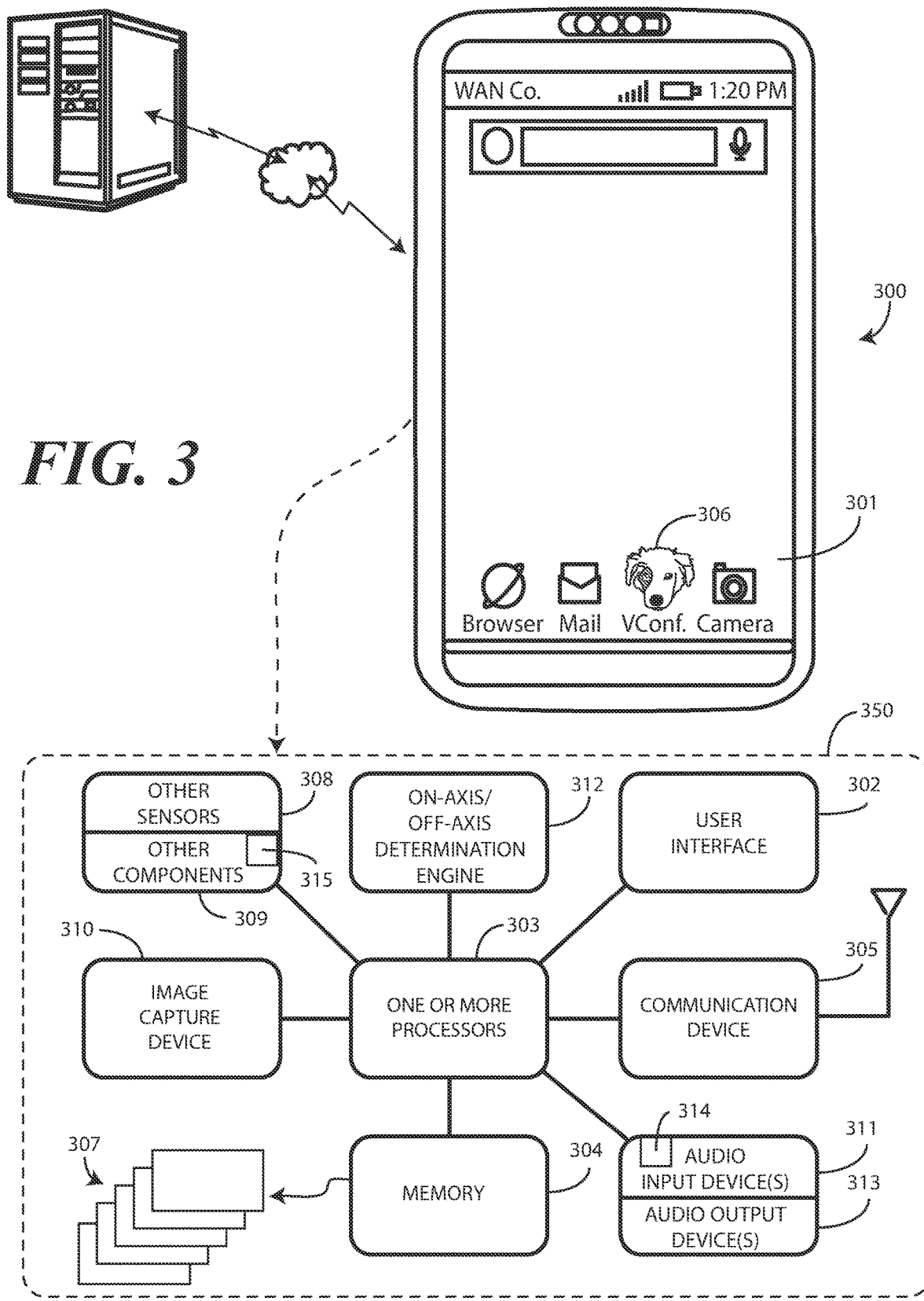
FIG. 3 illustrates one explanatory electronic device in accordance with one or more embodiments of the disclosure.

Turning now to FIG. 3, illustrated therein is one explanatory electronic device 300 suitable for use in videoconferencing applications and configured in accordance with one or more embodiments of the disclosure. The electronic device 300 of FIG. 3 is a portable electronic device. For illustrative purposes, the electronic device 300 is shown as a smartphone. However, as illustrated in FIG. 1 above, the electronic device 300 could be any number of other devices as well, including tablet computers, desktop computers, notebook computers, and so forth. Still other types of electronic devices suitable for use as a conferencing system terminal device in a videoconference or video chat can be configured in accordance with one or more embodiments of the disclosure as will be readily appreciated by those of ordinary skill in the art having the benefit of this disclosure.

This illustrative electronic device 300 includes a display 301, which may optionally be touch sensitive. In one embodiment where the display 301 is touch-sensitive, the display 301 can serve as a primary user interface 302 of the electronic device 300. Users can deliver user input to the display 301 of such an embodiment by delivering touch input from a finger, stylus, or other objects disposed proximately with the display 301.

In one embodiment, the display 301 is configured as an active-matrix organic light emitting diode (AMOLED) display. However, it should be noted that other types of displays, including liquid crystal displays, would be obvious to those of ordinary skill in the art having the benefit of this disclosure. Where the electronic device 300 is configured with a keyboard and/or mouse, such as when the electronic device 300 is configured as a computer, the keyboard and/or mouse can serve as the primary user interface 302.

A block diagram schematic 350 of the electronic device 300 is also shown in FIG. 3. The block diagram schematic 350 can be configured as a printed circuit board assembly disposed within the device housing of the electronic device 300. Various components can be electrically coupled together by conductors, or a bus disposed along one or more printed circuit boards.

In one or more embodiments, the electronic device 300 includes one or more processors 303. In one embodiment, the one or more processors 303 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 300. Each of the application processor and the auxiliary processor(s) can be configured to process and execute executable software code to perform the various functions of the electronic device 300. A storage device, such as memory 304, can optionally store the executable software code used by the one or more processors 303 during operation.

The electronic device 300 also includes a communication device 305 that can be configured for wired or wireless communication with one or more other devices or networks. The networks can include a wide area network, a local area network, and/or personal area network. The communication device 305 may also utilize wireless technology for communication, such as, but are not limited to, peer-to-peer or ad hoc communications such as HomeRF, Bluetooth and IEEE 802.11, and other forms of wireless communication such as infrared technology. The communication device 305 can include wireless communication circuitry, one of a receiver, a transmitter, or transceiver, and one or more antennas.

In one embodiment, the one or more processors 303 can be responsible for performing the primary functions of the electronic device 300. For example, in one embodiment the one or more processors 303 comprise one or more circuits operable with one or more user interface devices, which can include the display 301, to engage in videoconferences by transmitting, receiving, and presenting images, video, audio, or other presentation information. The executable software code used by the one or more processors 303, including that associated with a videoconference application 306, can be configured as one or more modules 307 that are operable with the one or more processors 303. Such modules 307 can store instructions, control algorithms, logic steps, and so forth.

In one embodiment, the one or more processors 303 are responsible for running the operating system environment of the electronic device 300. The operating system environment can include a kernel and one or more drivers, and an application service layer, and an application layer. The operating system environment can be configured as executable code operating on one or more processors or control circuits of the electronic device 300. The application layer can be responsible for executing application service modules. The application service modules may support one or more applications or "apps," such as the videoconference application 306. The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In one embodiment, the one or more processors 303 may generate commands or execute control operations based upon user input received at the user interface 302. Moreover, the one or more processors 303 may process the received information alone or in combination with other data, such as the information stored in the memory 304.

The electronic device 300 can include one or more sensors 308. The one or more sensors 308 may include an audio input 311, one example of which is a microphone. The one or more sensors 308 may also include audio output devices 313 such as an earpiece speaker, and/or a second loudspeaker.

In the illustrative embodiment of FIG. 3, the audio input (205) consisted of a single microphone. However, in other embodiments the audio input 311 can include multiple microphones combined with a beam steering engine 314. When functioning with the audio input 311, the beam steering engine 314 can process acoustic signals from, for example, a plurality of microphones defining a virtual microphone. This virtual microphone can define an acoustic reception cone that can be virtually "steered" around the electronic device 300. Alternatively, actual steering can occur as well, such as switching between a left microphone and right microphone, or between a front and back microphone, or switching various microphones ON and OFF individually. In one or more embodiments, two or more microphones can be included for selective beam steering by the beam steering engine 314.

Illustrating by example, a first microphone can be located on a first side of the electronic device 300 for receiving acoustic signals from a first direction, while a second microphone can be placed on a second side of the electronic device 300 for receiving acoustic signals from a second direction. These microphones can be "steered" by selectively turning them ON and OFF.

The beam steering engine 314 can then utilize the first microphone and the second microphone to beam steer audio reception toward an object, such as a user delivering acoustic signals in the form of speech. This beam steering can be responsive to input from other sensors 308, such as imagers, facial depth scanners, thermal sensors, or other sensors. For example, an imager can estimate a location of a person's face and deliver signals to the beam steering engine 314, thereby alerting it in which direction to focus the acoustic reception cone and/or steer the first microphone and the second microphone, thereby adding confirmation to audio steering and saving time. When the central directivity vector (206) associated with an acoustic polar pattern (207) delivered by a user is oriented off-axis relative to the audio input 311, the beam steering engine 314 can steer the audio reception beam toward the user in an effort to achieve an on-axis relationship. If the beam steering engine 314 is successful in reestablishing an on-axis relationship between the mouth of the person and the audio input 311 after the person has moved, it may be unnecessary to adjust the gain. However, if the central directivity vector (206) is unsuccessful in reestablishing the on-axis relationship, gain will still need to be adjusted. If the person stays still and turns their head, gain will be adjusted as well.

Alternatively, the beam steering engine 314 can process and combine the signals from two or more microphones to perform beam steering operations. The one or more microphones can be used for voice commands. In response to control of the one or more microphones by the beam steering engine 314, a user location direction can be determined. The beam steering engine 314 can then select between the first microphone and the second microphone to beam steer audio reception toward the user. Alternatively, an audio input/processor can employ a weighted combination of the microphones to beam steer audio reception toward the user. Regardless of how the acoustic signals are received, in one or more embodiments the directional output of each microphone can be adjusted to point at, and define, a sound reception "beat spot" at the location where the user uttering the acoustic signals.

The one or more other sensors 308 may also include touch actuator selection sensors, proximity sensors, a touch pad sensor, a touch screen sensor, a capacitive touch sensor, and one or more switches. Touch sensors may be used to indicate whether any of the user actuation targets present on the display 301, including the user actuation target of the videoconferencing application 306, are being actuated. The other sensors 308 can also include additional audio sensors and additional image or video sensors.

Other components 309 operable with the one or more processors 303 can include output components such as video outputs, audio outputs, and/or mechanical outputs. Examples of output components include audio outputs such as speaker port, earpiece speaker, or other alarms and/or buzzers and/or a mechanical output component such as vibrating or motion-based mechanisms. Still other components will be obvious to those of ordinary skill in the art having the benefit of this disclosure.

The other components 309 can also include an audio input/processor 315. The audio input/processor 315 can include hardware, executable code, and speech monitor executable code in one embodiment. The audio input/processor 315 can include, stored in memory 304, basic speech models, trained speech models, or other modules that are used by the audio input/processor 315 to receive and identify voice commands that are received by the audio input 311 and captured by an audio input/processor 315. The audio input/processor 315 can adjust the gain of the audio input 311 as described herein. In one embodiment, the audio input/processor 315 can include a voice recognition engine. Regardless of the specific implementation utilized in the various embodiments, the audio input/processor 315 can access various speech models to identify speech commands in one or more embodiments.

In one or more embodiments, the audio input/processor 315 is operable to receive acoustic signals from a source, such as a person, authorized user, plurality of persons within an environment about the electronic device 300, from the environment about the electronic device 300, or combinations thereof. The audio input/processor 315 can include hardware, executable code, and speech monitor executable code in one embodiment.

To capture video during a videoconference, in one or more embodiments the electronic device 300 includes an imager 310 or another image capture device. The electronic device 300 can optionally include a depth imager as well.

In one embodiment, the imager 310 comprises a two-dimensional imager configured to receive at least one image of a person within an environment of the electronic device 300. In one embodiment, the imager 310 comprises a two-dimensional RGB imager. In another embodiment, the imager 310 comprises an infrared imager. Other types of imagers suitable for use as the imager 310 of the electronic device 300 will be obvious to those of ordinary skill in the art having the benefit of this disclosure.

In one or more embodiments, the electronic device 300 includes an on-axis/off-axis determination engine 312. In one or more embodiments, the on-axis/off-axis determination engine 312 is operable with the one or more processors 303. In some embodiments, the one or more processors 303 can control the on-axis/off-axis determination engine 312. In other embodiments, the on-axis/off-axis determination engine 312 can operate independently, sensing contextual information from the one or more sensors 308 and/or receiving or identifying contextual information from remote servers and electronic devices using the communication device 305 to the one or more processors 303. The on-axis/off-axis determination engine 312 can receive data from the various sensors 308. In one or more embodiments, the one or more processors 303 are configured to perform the operations of the on-axis/off-axis determination engine 312.

In one or more embodiments, the on-axis/off-axis determination engine 312 is operable to determine from one or more images captured by the imager 310 whether the mouth of a subject engaging the electronic device 300 is on-axis or off-axis relative to the audio input 311. The on-axis/off-axis determination engine 312 can do this by determining whether a central directivity vector of acoustic signals emanating from the mouth of the subject are oriented toward the audio input 311 in one or more embodiments. In other embodiments, the on-axis/off-axis determination engine 312 can determine this by determining an azimuth of the head of the subject relative to the electronic device 300 or audio input 311, a tilt of the head relative to the electronic device 300 or audio input 311, and a geometric location of the head relative to the electronic device 300 or audio input 311. In still other embodiments, the on-axis/off-axis determination engine 312 can determine this by detecting, in the one or more images of the subject, one or more of the eyes of the subject, the nose of the subject, the mouth of the subject, the facial outline of the subject, or combinations thereof. Other techniques for determining the orientation of the mouth will be obvious to those of ordinary skill in the art having the benefit of this disclosure.

It is to be understood that FIG. 3 is provided for illustrative purposes only and for illustrating components of one electronic device 300 in accordance with embodiments of the disclosure and is not intended to be a complete schematic diagram of the various components required for an electronic device. Therefore, other electronic devices in accordance with embodiments of the disclosure may include various other components not shown in FIG. 3 or may include a combination of two or more components or a division of a particular component into two or more separate components, and still be within the scope of the present disclosure.

Embodiments of the disclosure contemplate that electronic devices used in videoconferencing applications can be operable with companion electronic devices in a "ready for" environment. Illustrating by example, the electronic device 300 of FIG. 3 can include a companion device integration manager. The companion device integration manager can be used to communicate with a companion electronic device, examples of which include the companion electronic device (113) of FIG. 1, the external microphone (114) of FIG. 1, or another type of electronic device. To illustrate by example one such companion electronic device, FIG. 4 illustrates a content presentation companion device 700 with a larger display and audio input device suitable for use with the electronic device 300 of FIG. 3 in videoconferencing applications.

Figure 4:
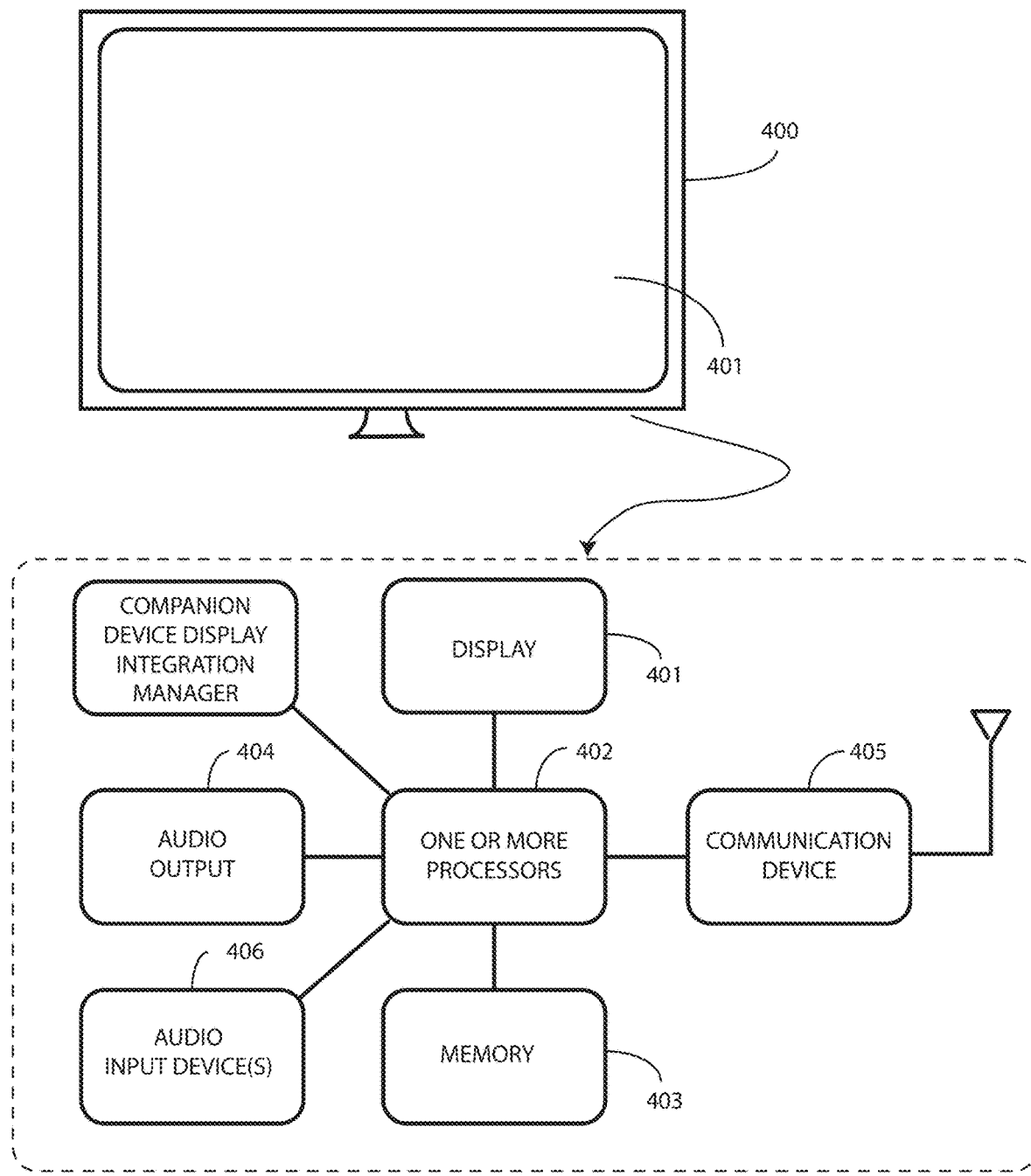
FIG. 4 illustrates one explanatory companion electronic device in accordance with one or more embodiments of the disclosure.

Turning now to FIG. 4, in this illustrative embodiment the companion electronic device 400 is a content presentation companion device configured as a color video monitor. In other embodiments, the companion electronic device 400 can take other forms. Illustrating by example, the companion electronic device 400 can be an external microphone, a computer interface coupled to one or more peripheral devices, a docking station, a television, a computer display, a laptop computer, a tablet computer, or a projector projecting content onto a screen. Other examples of companion electronic devices 400 will be obvious to those of ordinary skill in the art having the benefit of this disclosure.

Regardless of configuration, in one or more embodiments the companion electronic device 400 includes one or more processors 402, a display 401, a memory 403, an audio output 704, a communication device 705 capable of wired or wireless communication with an electronic device such as the electronic device (300) of FIG. 3, and an audio input 406 capable of receiving acoustic signals having audible frequencies from the mouth of a subject engaging the companion electronic device 400.

In one or more embodiments, when coupled by a wireless connection to such an electronic device (300), the companion electronic device 400 can function as one or both of an auxiliary display and/or auxiliary audio input for the electronic device (300). The electronic device (300) can receive content, one example of which includes one or more videoconference feeds, from a terrestrial broadcast network, cable television network, videoconference server, Internet streaming service, or combinations thereof, and redirect this content to the companion electronic device 400 (using its companion electronic device integration manager). One reason for this may be because the display 401 of the companion electronic device 400 is larger than the display (301) of the electronic device (300). Alternatively, as described above with reference to participant (110) in FIGS. 1 and 2, the audio input 406 of the companion electronic device 400 may be closer to the mouth of the user than is the audio input (311) of the electronic device (300). In either application, content flows between the companion electronic device 400 and the electronic device (300) through the communication device 405.

Figure 14:
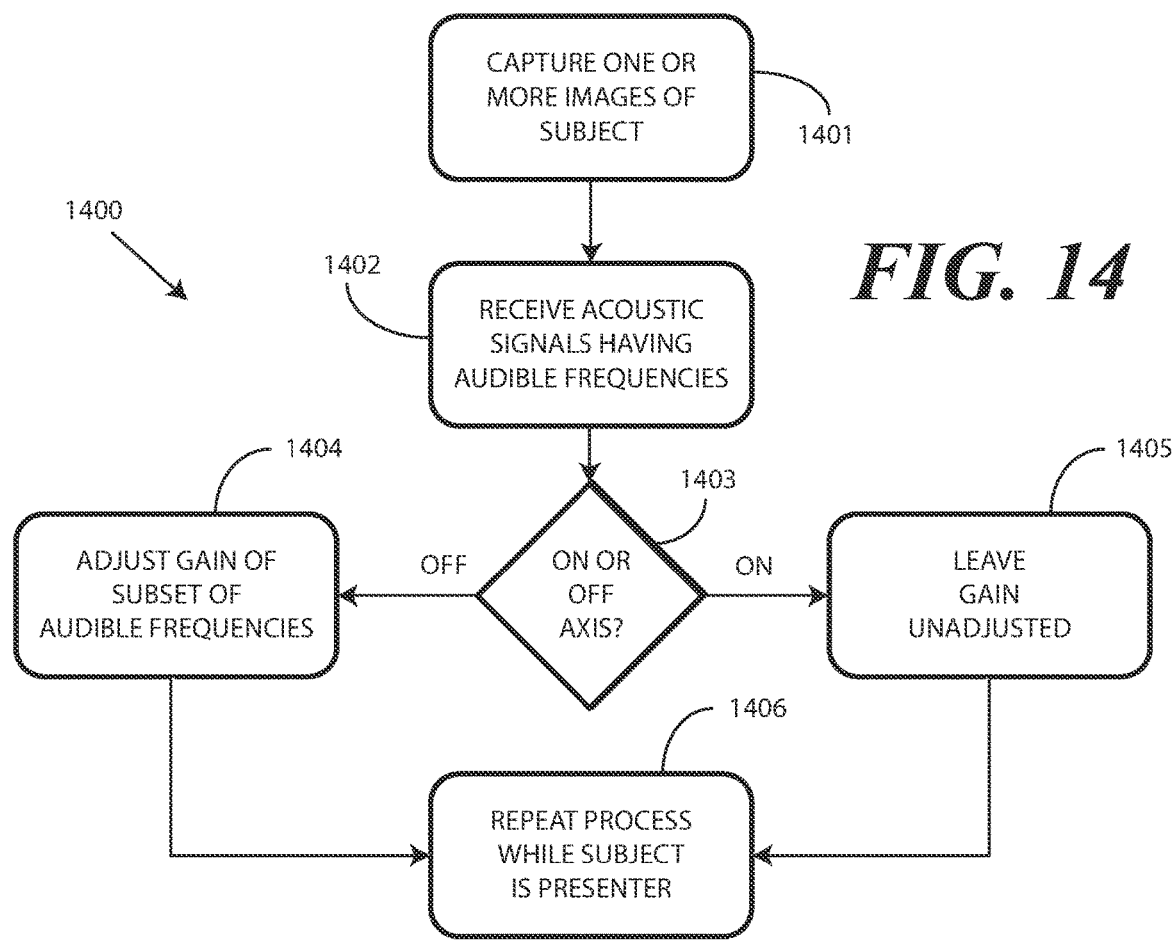
FIG. 14 illustrates one explanatory method in accordance with one or more embodiments of the disclosure.

Turning now to FIG. 14, illustrated therein is one explanatory method 1400 in accordance with one or more embodiments of the disclosure. The method 1400 can be configured as one or more modules, segments, or portions of code which include one or more executable instructions for one or more processors of an electronic device or companion electronic device for implementing specific logical functions or steps in the process of spectrally adjusting the gain of audio input associated with a subset of audible frequencies of audio signals received by an audio input of an electronic device.

Beginning at step 1401, an imager of an electronic device captures one or more images of a subject engaging the electronic device. In one or more embodiments, step 1401 comprises the imager capturing the one or more images of the subject while the subject is engaged in a videoconference.

At step 1402, an audio input of the electronic device receives acoustic signals having audible frequencies. In one or more embodiments, step 1402 comprises the audio input receiving the acoustic signals from the mouth of the subject while the subject is speaking during a videoconference.

At decision 1403, one or more processors of the electronic device determine from the one or more images captured at step 1401 whether the mouth of the subject is oriented on-axis or off-axis relative to the audio input of the electronic device. This decision 1403 can be made in a variety of ways.

Figure 19:
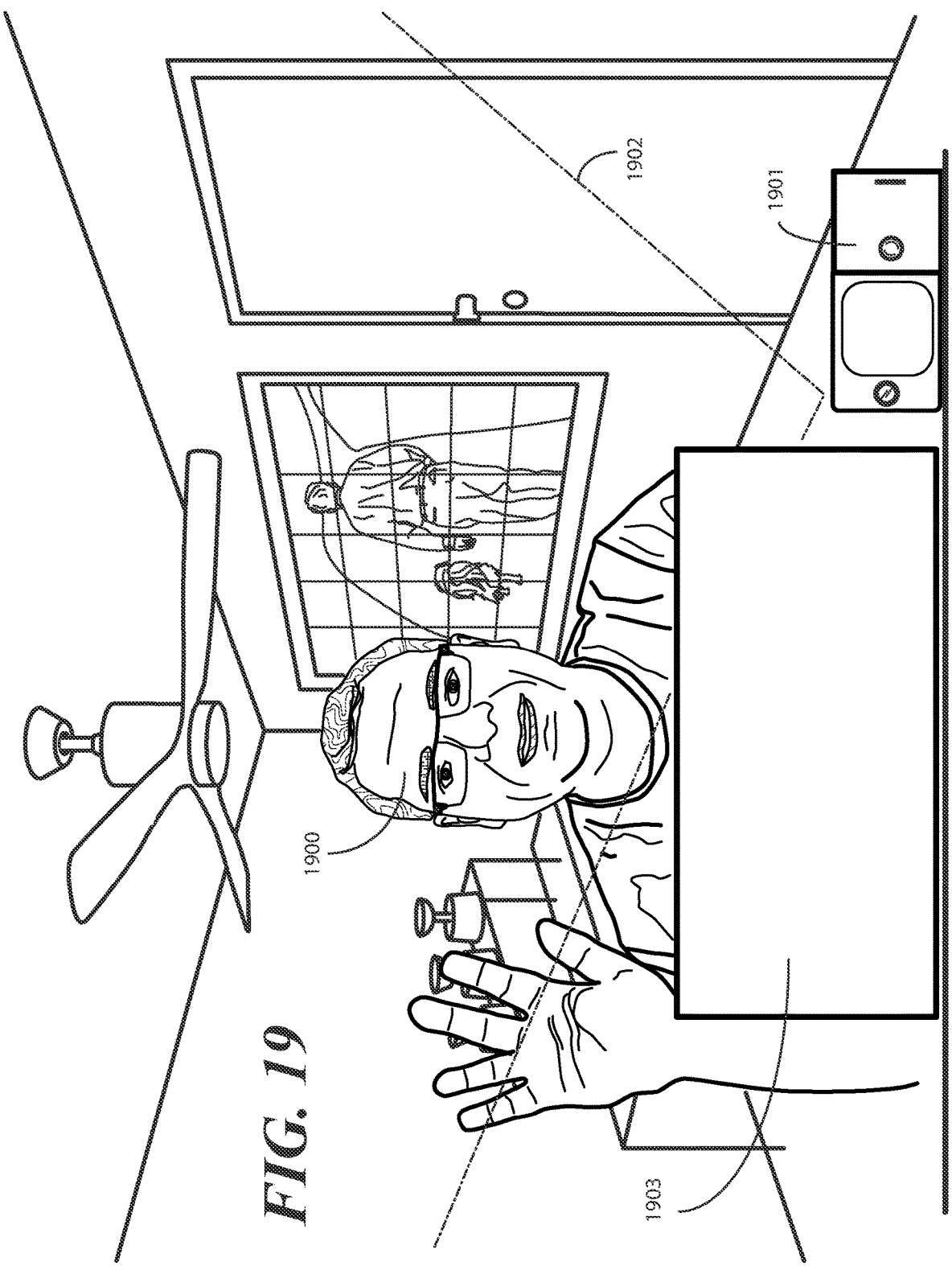
FIG. 19 illustrates a subject engaged in a videoconference using an electronic device and companion electronic device configured in accordance with one or more embodiments of the disclosure.
Figure 20:
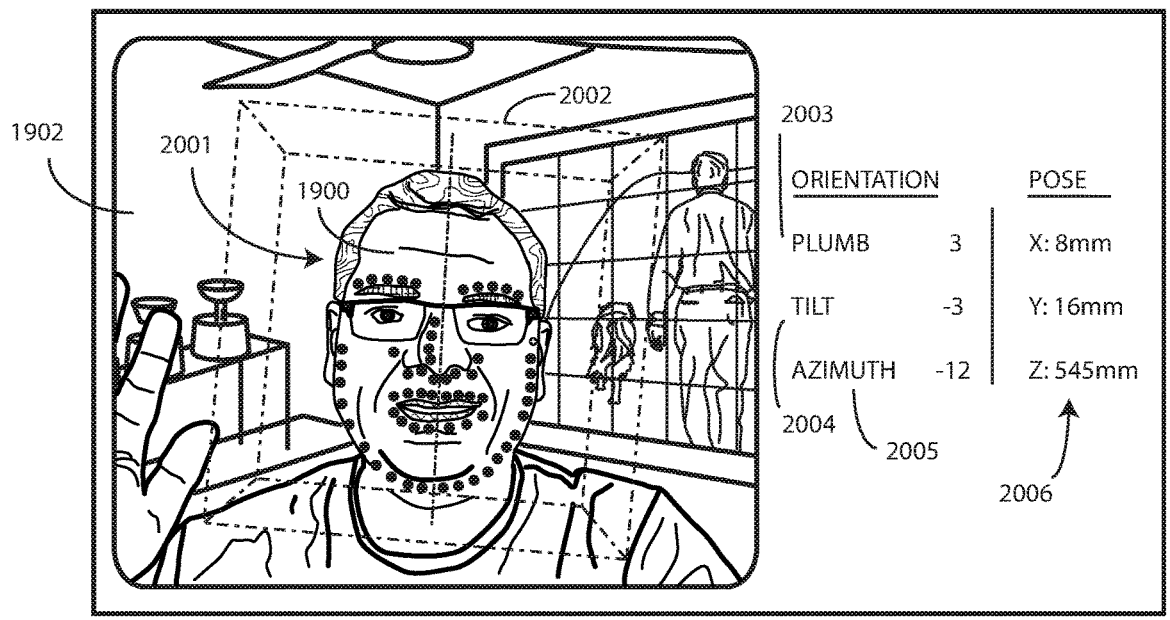
FIG. 20 illustrates facial tracking of the subject of FIG. 18 to determine an orientation of the subject in three-dimensional space.

In one or more embodiments, the one or more processors can perform image processing steps to determine, from a depiction of the subject in the one or more images, an orientation of the head, face, or other characteristic feature of the subject relative to the electronic device, and in particular, relative to the audio input of the electronic device. In one or more embodiments, decision 1403 is made by comparing a defining characteristic of head of the subject to a predefined reference to determine the orientation of the head in three-dimensional space. Illustrating by example, a characteristic of the subject used to determine orientation may be a vertically running characteristic, examples of which include the nose, separation between the eyebrows, or the medial vertical axis of the face. Similarly, a characteristic of the subject used to determine the orientation of the head in three-dimensional space may be a horizontally running characteristic, examples of which include a line running ear to ear, eye to eye, the eyebrows, the smile, the hairline, the top of the head, the chin, or the medial horizontal axis of the face. Of course, a combination of these features can be used as well. Turning briefly to FIGS. 19 and 20, illustrated therein is a depiction of how this can occur.

Beginning with FIG. 19, illustrated therein is a person 1900 engaged in a videoconference. As shown in FIG. 19, the person 1900 is using a smartphone 1901 having a first device housing that is pivotable about a hinge relative to a second device housing between an axially displaced open position and a closed position to capture one or more images 1902 of himself during the videoconference.

In FIG. 19, the smartphone 1901 is in a partially open position with its imager capturing one or more images 1902 of an environment of the smartphone. The smartphone 1901 is being used as a "webcam" in the videoconference, while a larger monitor is being used as a content presentation companion device 1903. Since the smartphone 1901 has a more advanced image capture device than the content presentation companion device 1903, the person 1900 prefers to use it to capture images to be used in the videoconference. However, since the display of the content presentation companion device 1903 is much larger than the display of the smartphone 1901, the person 1900 prefers to use the content presentation companion device 1903 as a primary display in the videoconference so that he can more clearly see his friends, each of whom are engaged in the videoconference.

Since the smartphone 1901 includes a first device housing that is pivotable about a hinge relative to a second device housing, the person 1900 has pivoted the smartphone 1901 to a partially open position. Additionally, the person 1900 has placed the smartphone 1901 sideways on the desk so that the smartphone 1901 resembles a two-picture frame where the two picture frame portions are joined by the hinge. This orients the imager of the smartphone 1901 in the landscape orientation in three-dimensional space.

As shown in FIG. 20, one or more processors of the smartphone (1901) perform image processing steps on the one or more images 1902 captured by the imager to determine, from a depiction 2001 of the person 1900 in the one or more images 1902, an orientation 2002 of the head and face using a plurality of characteristic features of the person. The one or more processors apply sensing spots to depictions 2001 of the person 1900 that model a combination of vertically running characteristics and horizontally running characteristics of the person 1900 so that a plumb measurement 2003 of the head, a tilt measurement 2004 of the head, an azimuth measurement 2005 of the head, and a geometric location 2006 of the head in three-dimensional space. This allows the one or more processors to model the orientation 2002 of the head to determine whether the mouth of the person 1900 is on-axis or off-axis relative to the audio input.

In this illustrative embodiment, the sensing spots are placed along defining characteristics of head of the person 1900 to determine the orientation 2002 of the head in three-dimensional space. The sensing spots are placed along both vertically running characteristics, examples of which include the nose and cheeks, as well as along horizontally running characteristics, examples of which include the chin, the base of the nose, the mouth, and the eyebrows.

The orientation 2002 of the head in three-dimensional space, and thus the determination of whether the mouth is on-axis or off-axis relative to the audio input, can be determined in other ways as well. The one or more processors may determine the orientation 2002 of the head from reference lines such as a line running from eye to eye or a medial line running along the nose. Alternatively, the one or more processors may identify the top of a head of the person 1900 and comparing this head top line to one or more reference lines, one of which can be the frame edge of the captured images 1902.

Another way to determine the orientation 2002 of the head of the person 1900 is to use reference lines associated with facial features. Examples of such facial features include a line running ear to ear, eye to eye, the eyebrows, the smile, the hairline, the top of the head, the chin, the medial horizontal axis of the face, or other horizontally running facial features. These facial features can also include vertically running characteristics, examples of which include the nose, the medial vertical axis of the face, or the neck. In one or more embodiments, using facial recognition technology or other similar techniques, the one or more processors determine the orientation 2002 of the user's face relative to the orientation of the electronic device (defined by the orientation of the imager or image capture device as it is fixedly positioned along the device housing) by comparing the facial features to major and minor dimensions of the electronic device itself.

Figure 15:
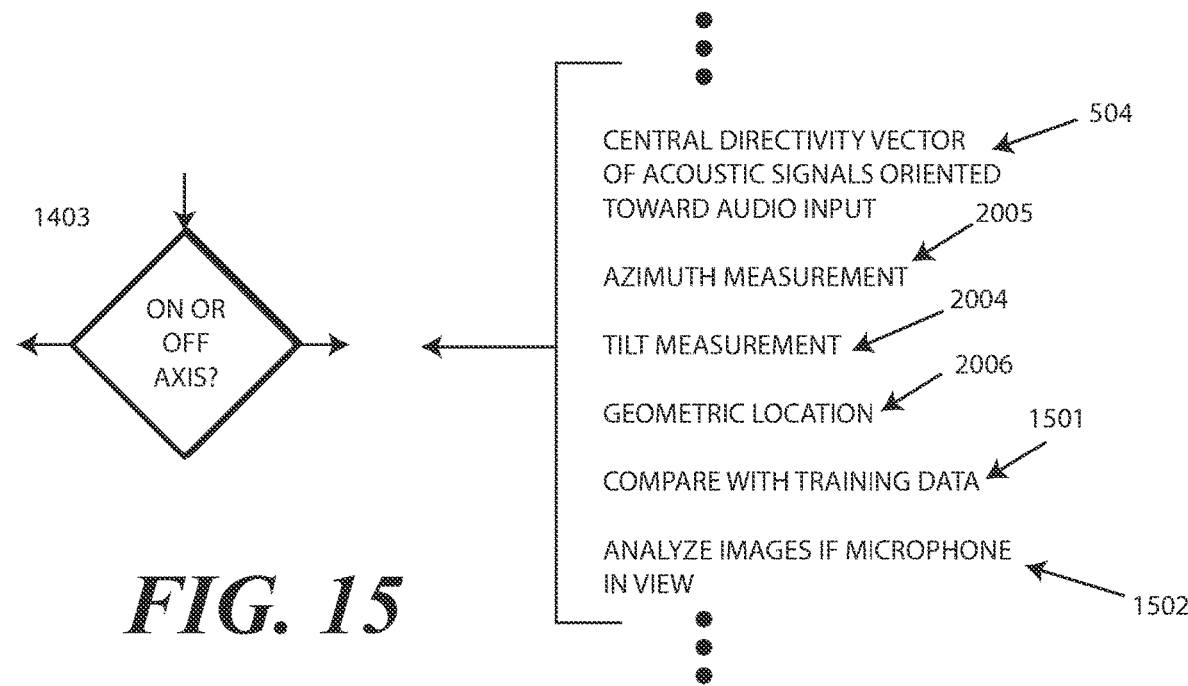
FIG. 15 illustrates one or more method steps in accordance with one or more embodiments of the disclosure.

Turning now to FIG. 15, a brief summary of techniques for determining, at decision 1403, whether the mouth of the subject is oriented on-axis or off-axis relative to the audio input is illustrated. As shown, in one or more embodiments the one or more processors determine whether the mouth of the subject is oriented on-axis or off-axis relative to the audio input by determining whether a central directivity vector 504 of the acoustic signals received at step (1402) is oriented toward the audio input.

In other embodiments, the one or more processors determine whether the mouth of the subject is oriented on-axis or off-axis relative to the audio input by determining an azimuth measurement 2005. In other embodiments, the one or more processors determine whether the mouth of the subject is oriented on-axis or off-axis relative to the audio input by determining a tilt measurement 2004. In other embodiments, the one or more processors determine whether the whether the mouth of the subject is oriented on-axis or off-axis relative to the audio input by determining a geometric location 2006 of the head of the subject relative to the electronic device and/or the audio input. Of course, these measurements can be used in combination as described above with reference to FIG. 20.

In one or more embodiments, a comparison 1501 of these measurements can be compared with training data when a training method (described below with reference to FIG. 18) is used. Image analysis 1502 can also be used to determine if the microphone is depicted in the one or more images, with that image analysis directly calculating whether the central directivity vector of the acoustic signals is oriented toward the audio input defined by the microphone. Other techniques will be obvious to those of ordinary skill in the art having the benefit of this disclosure.

Turning now back to FIG. 14, if the one or more processors of the electronic device determine from the one or more images captured at step 1401 that the mouth of the subject is off-axis relative to the audio input, the one or more processors adjust a gain of the audio input associated with a subset of the audible frequencies received at step 1402. In one or more embodiments, this subset of audible frequencies is between one thousand and ten thousand Hertz. In other embodiments, the subset of audible frequencies is between one thousand and five thousand Hertz. In one or more embodiments, the gain adjustment is at least five decibels.

Figure 16:
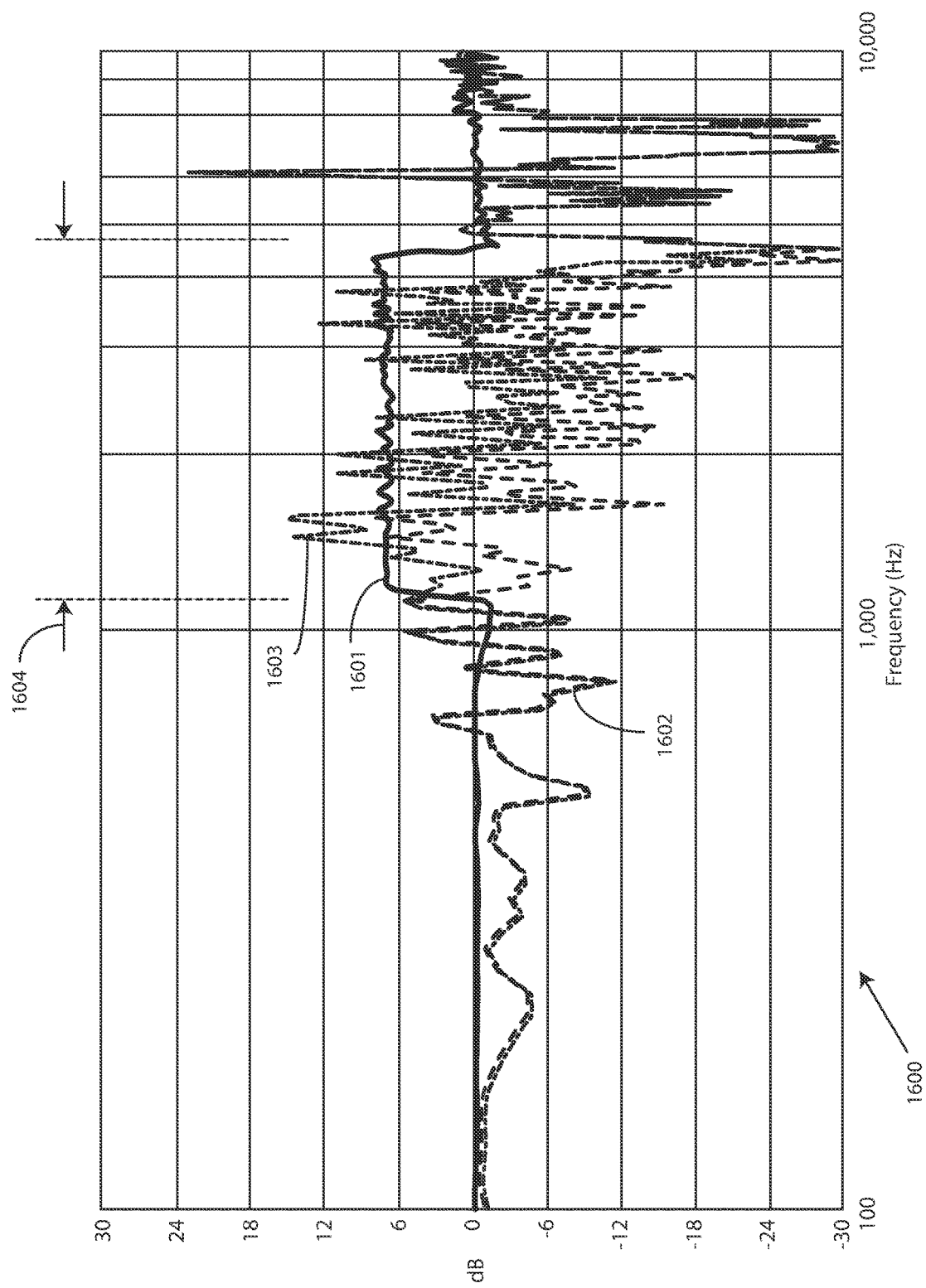
FIG. 16 illustrates one explanatory spectral audio adjustment function adjusting a gain of audio in put associated with a subset of audible frequencies when a mouth of a subject is oriented off-axis relative to an audio input of an electronic device or companion electronic device in accordance with one or more embodiments of the disclosure.

Turning now briefly to FIG. 16, illustrated therein is a sound pressure level plot 1600 illustrating a frequency plot of the acoustic signals received at step (1402) of FIG. 14 both before (acoustic signals 1602) and after (acoustic signals 1603) the gain 1601 of step (1404) is applied. As shown, the gain 1601 is spectrally applied only to the frequencies between one thousand Hertz and five thousand Hertz in this illustrative embodiment. Additionally, the gain 1601 is above six decibels.

As shown in this sound pressure level plot 1600, rather than adjusting the volume of all audible frequencies associated with the acoustic signals 1602 received by the audio input, embodiments of the disclosure instead spectrally adjust the gain 1601 of the audio input for only a subset 1604 of audible frequencies. Embodiments of the disclosure spectrally adjust the gain 1601 for this midrange subset 1604 of frequencies to specifically avoid adjusting any gain associated with low end (frequencies between one hundred Hertz and one thousand Hertz) and high end (frequencies above five or ten thousand Hertz) because these midrange frequencies are associated with speech intelligibility, which occurs generally in a range of between one thousand and four thousand Hertz. In contrast to prior art systems that adjust the overall volume, embodiments of the disclosure spectrally adjust only the midrange frequencies associated with speech, thereby improving overall intelligibility of speakers speaking during videoconferences and other similar sessions.

Applying gain 1601 to only a midrange set of frequencies advantageously offers a significant and meaningful difference in contrast to prior art systems. When a speaker turns their head, the response below one thousand Hertz is not attenuated. Accordingly, applying gain 1601 to frequencies in the full audible spectrum (twenty Hertz to twenty thousand Hertz) is non-ideal in that it amplifies the lower frequencies relative to the higher frequencies. Advantageously, applying the gain 1601 to only the subset 1604 of the audible frequencies is less noticeable to the end user. Embodiments of the disclosure work to improve intelligibility without calling attention to the fact that a gain adjustment is occurring.

Turning now back to FIG. 14, where the one or more processors determine, at decision 1403, that the mouth of the subject is oriented on-axis relative to the audio input, the gain remains unchanged at step 1405. The method 1400 can then repeat at step 1406 as the person continues to move their head in three-dimensional space while engaging the electronic device during a videoconference.

Figure 21:
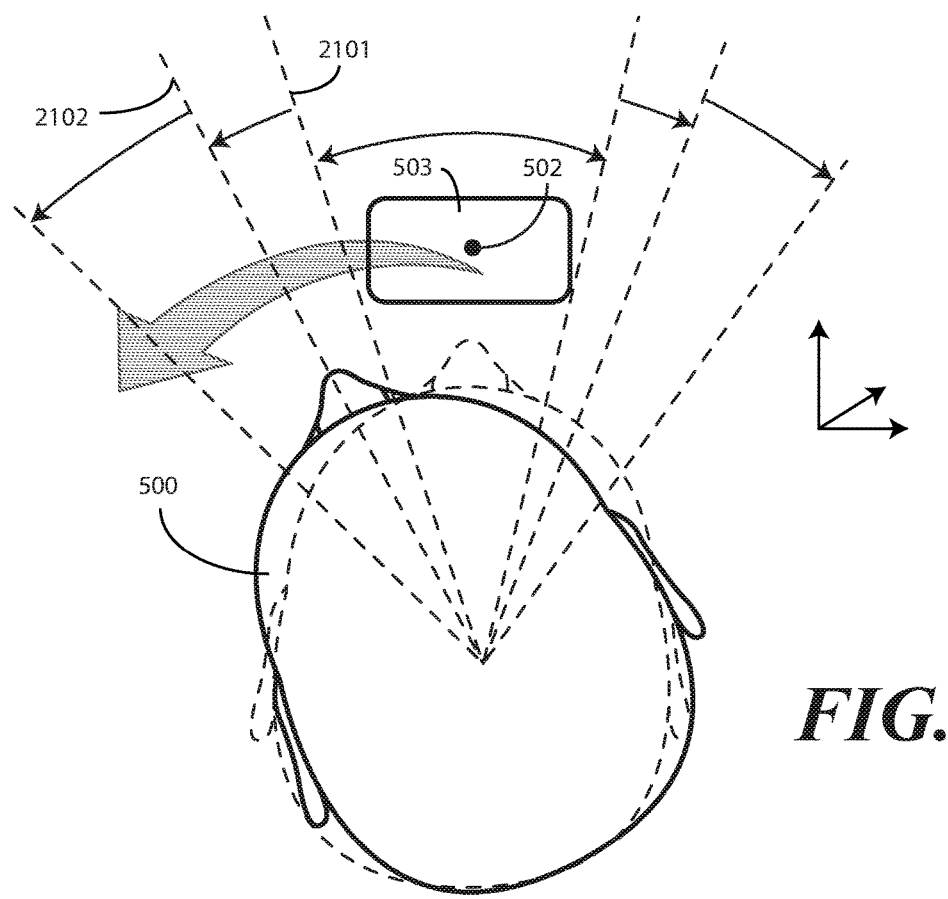
FIG. 21 illustrates one or more gain adjustment thresholds in accordance with one or more embodiments of the disclosure.

In one or more embodiments, decision 1403 comprises determining whether the mouth of the subject is oriented off-axis relative to the audio input of the electronic device by at least a predefined amount, with step 1404 only occurring when the mouth is oriented off-axis relative to the audio input of the electronic device by more than a predefined threshold. Turning now to FIG. 21, illustrated therein is this concept of adjusting gain only after the mouth is oriented off-axis relative to the audio input by a predefined threshold.

As shown in FIG. 21, gain adjustments to the subset of audible frequencies can occur in a stepwise manner only after the subject's head rotates off-axis relative to the audio input 502 of the electronic device 503 by at least a predefined rotation amount, which is represented by one or more predefined rotation thresholds. Specifically, one or more processors of the electronic device 503 can apply the gain only when the mouth of the subject 500 is off-axis relative to the audio input 502 by more than a first predefined rotation threshold 2101. Thereafter, the one or more processors can further adjust the gain only after the orientation of the head moves off-axis relative to the audio input 502 by more than a second predefined rotation threshold 2102 that is greater than the first predefined rotation threshold 2101, and so forth. In one or more embodiments, the second predefined rotation threshold 2102 is at least twice the predefined rotation threshold 2101.

This can occur in both directions. In FIG. 21, the spaces between these thresholds represent rotation ranges from an initial orientation where the mouth if the subject 500 is oriented on-axis with the audio input 502 of the electronic device 503.

Figure 17:
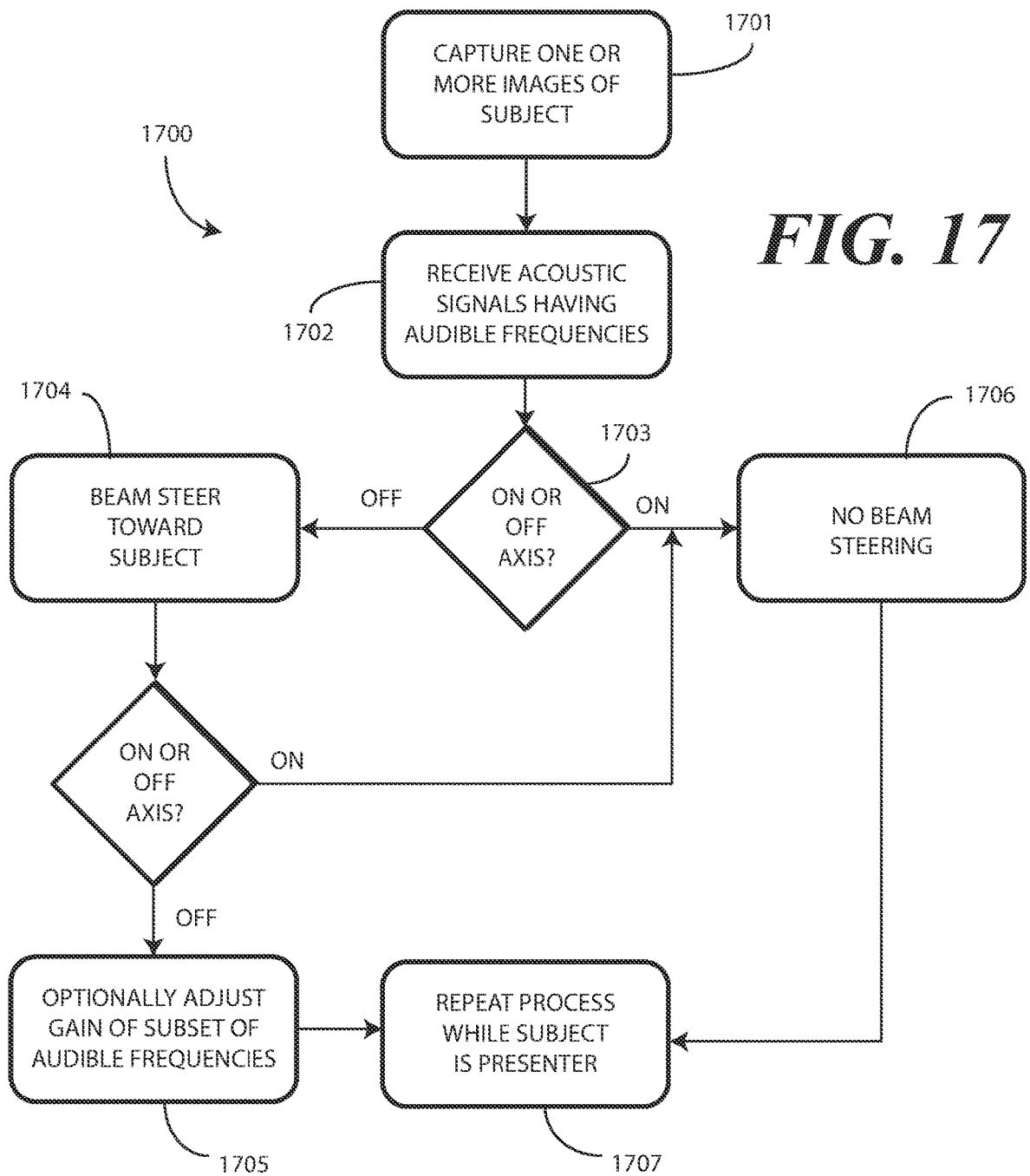
FIG. 17 illustrates another explanatory method in accordance with one or more embodiments of the disclosure.

Turning now to FIG. 17, illustrated therein is another method 1700 of adjusting the gain of a subset of audible frequencies associated with acoustic signals when the mouth of a subject is oriented off-axis relative to an audio input. The method 1700 of FIG. 17 is similar to the method (1400) of FIG. 14, except that it includes a beam steering component as well.

As described above with reference to FIG. 3, electronic devices configured in accordance with embodiments of the disclosure can include multiple microphones combined with a beam steering engine. The beam steering engine can process acoustic signals from a plurality of microphones defining a virtual microphone. This virtual microphone can define an acoustic reception cone that can be virtually steered around the electronic device as described above with reference to FIG. 3.

At step 1701, an imager captures one or more images of a subject of the electronic device. At step 1702, an audio input receives acoustic signals from the mouth of the subject while the subject is engaging the electronic device.

At decision 1703, one or more processors of an electronic device determine visually from the one or more images of the subject whether the mouth of the subject is oriented on-axis or off-axis relative to the audio input. Any of the techniques described above can be used to make the determination. Illustrating by example, in one or more embodiments the one or more processors determine from the one or more images of the subject whether the mouth of the subject is oriented on-axis relative to the audio input by detecting, in the one or more images of the subject, one or more if the eyes of the subject, the nose of the subject, the mouth of the subject, the facial outline of the subject, or combinations thereof, as described above with reference to FIG. 20.

In one or more embodiments, at step 1704 the one or more processors cause the audio input to beam steer a reception beam of the audio input toward the mouth of the subject when the mouth of the subject is oriented off-axis relative to the audio input. At step 1705, the one or more processors can optionally adjust a gain of the audio input associated with a subset of audible frequencies associated with the acoustic signals received at step 1702 if the beam steering operation of step 1704 fails to cause the reception beam to be oriented on-axis with the mouth. If the beam steering operation of step 1704 causes the reception beam to be oriented on-axis with the mouth, or if decision 1703 detects the mouth being oriented on-axis with the audio input, step 1706 precludes the application of any gain. The method 1700 can then repeat at step 1707 as the subject continues to move their head.

Figure 18:
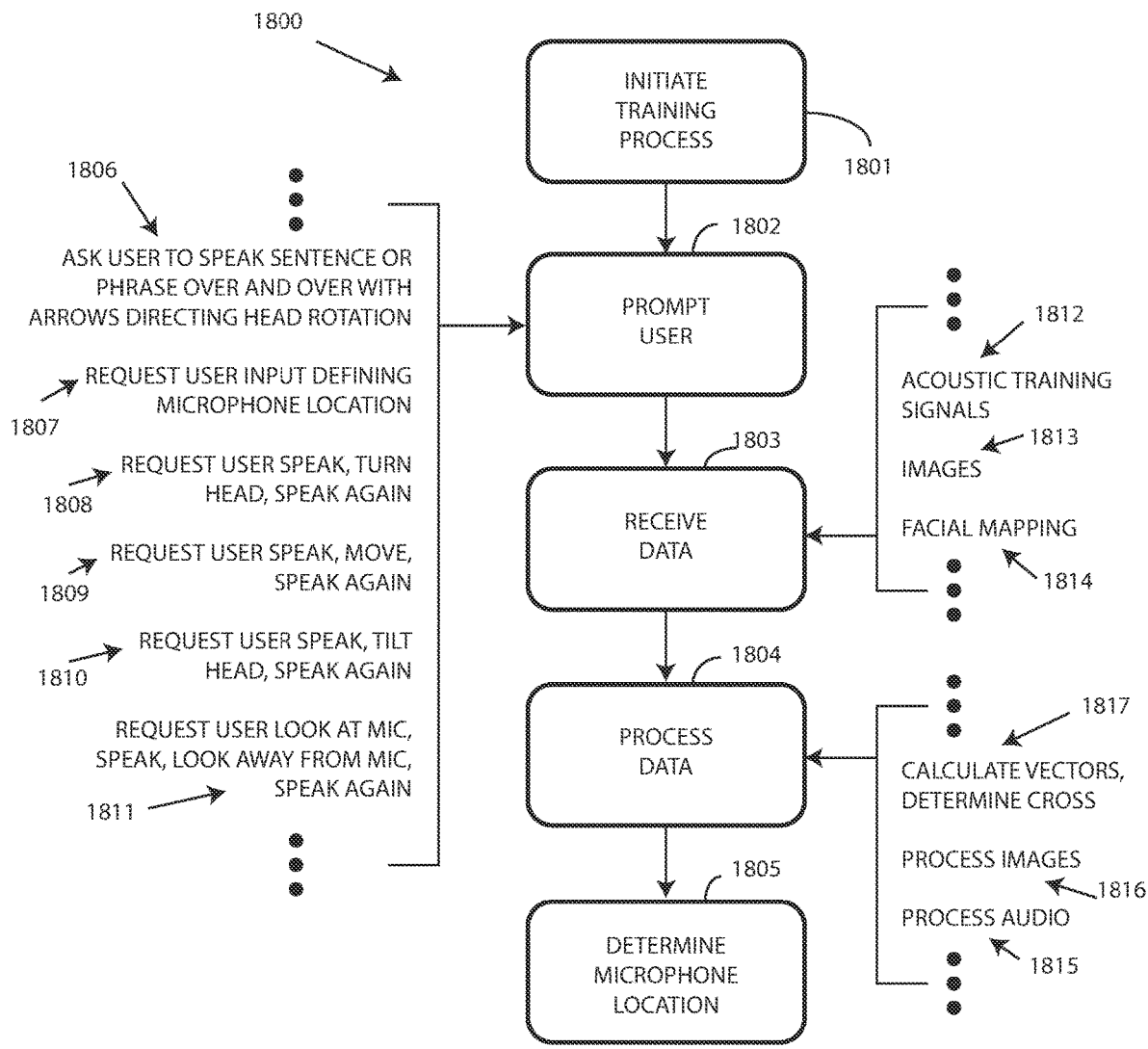
FIG. 18 illustrates yet another explanatory method in accordance with one or more embodiments of the disclosure.

When the audio input and the imager are in the same electronic device, the physical relationship between the two is fixed and is known to the one or more processors of the electronic device. Accordingly, the methods described above can work without training because the one or more processors can determine the relationship between the mouth and the audio input simply by performing an image analysis on images depicting the subject. However, in hybrid systems such as those described above with reference to FIGS. 1 and 2, such as when an external microphone is being used, it may be advantageous to perform a training operation so the one or more processors can identify the location of the microphone relative to the device in which the imager is situated. This training method can be used to calculate vectors to determine the location of the audio input when the audio input is configured as a companion electronic device. Turning now to FIG. 18, illustrated therein is one such method 1800.

At step 1801, a training process is initiated. In response, step 1802 comprises prompting, using a user interface, the user to take one or more actions to train the one or more processors regarding where the audio input is in relation to the imager. Illustrating by example, in one or more embodiments the prompt 1806 can ask the user to speak a sentence over and over with arrows directing a head direction while this is occurring. By detecting speech with the head in multiple positions, as detected by the imager, the one or more processors can calculate a plurality of vectors between the mouth of the user and the microphone, with the intersection of the vectors occurring at the mouth. The location of the microphone is then determined from this plurality of vectors.

In another embodiment, the prompt 1807 can request the user to input, using one or more user settings, a physical location of the microphone relative to the electronic device. The prompt 1807 may ask the user how many inches, and in what direction, the microphone is situated for example. The prompt 1807 may even ask the user to select a location on a graphical user interface depicting the electronic device where the microphone is situated.

In another embodiment, the prompt 1808 requests that the user speak, turn their head, and speak again. As with prompt 1806, By detecting speech with the head in multiple positions, as detected by the imager, the one or more processors can calculate a plurality of vectors between the mouth of the user and the microphone, with the intersection of the vectors occurring at the mouth. The location of the microphone is then determined from this plurality of vectors.

In a similar manner, the prompt 1809 can ask the user to speak, move, and then speak again. Effectively, this prompt 1809 requests the user to speak from both a first geometric location relative to the electronic device and a second geometric location relative to the electronic device. This allows the one or more processors to determine whether the mouth of the subject is oriented on-axis relative to the audio input or off-axis relative to the audio input once the training is complete.

Alternatively, the prompt 1810 can ask the user to speak, tilt their head, and then speak again. These prompts 1809, 1810, like prompts 1806,1807,1808, request the subject to change one or more of an azimuth of the head of the subject relative to the electronic device, a tilt of the head of the subject relative to the electronic device, a geometric location of the head of the subject relative to the electronic device, or combinations thereof.

In yet another embodiment, the prompt 1811 can ask the user to look directly at the microphone and speak, look away from the microphone, and then speak again. This results in the reception of training acoustic signals 1812 when the audio input is a physically separate device from the electronic device while the mouth is oriented one of on-axis or off-axis relative to the audio input and also receiving other training acoustic signals from the subject while the mouth of the subject is oriented another of on-axis or off-axis relative to the audio input.

The data from the training steps is then received at step 1803. This data includes the training acoustic signals 1812 having the audible frequencies associated therewith, the images 1813 of the user, and optionally facial mapping 1814 such as that described above with reference to FIG. 20. The data is then processed at step 1804. This processing can include image processing 1815, audio processing 1816, and vector calculation 1817 to determine the location of the microphone at step 1805. This results in a determination from the training acoustic signals and the other training acoustic signals a geometric location of the audio input relative to the electronic device.

Once the training is complete, the method (1400) of FIG. 14 or the method (1700) of FIG. 17 can be performed. An audio input can receive acoustic signals having audible frequencies from a subject while the mouth of the subject is oriented off-axis relative to the audio input, and the one or more processors can adjust the gain of the audio input for only a subset of the audible frequencies to compensate.

Figure 22:
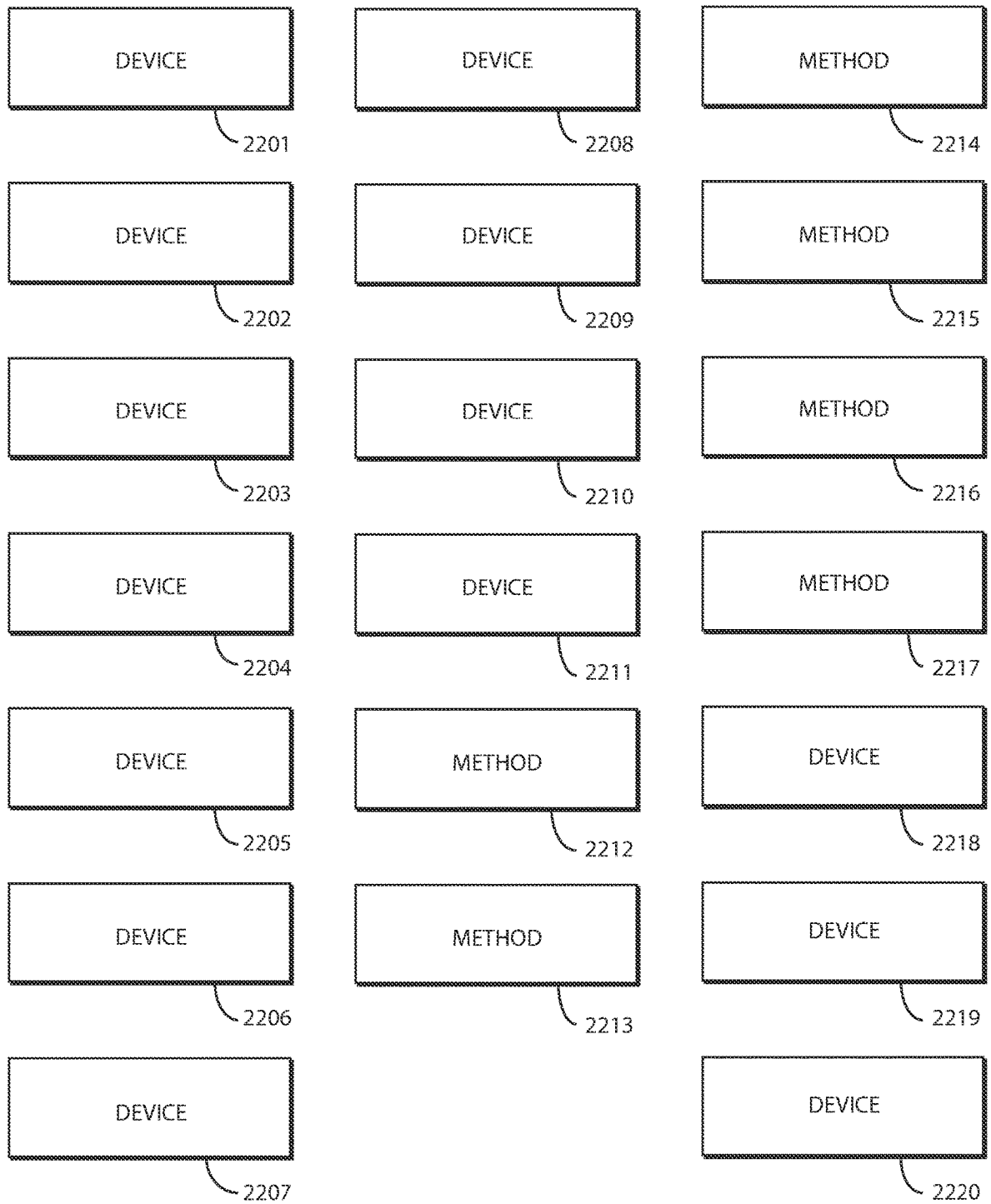
FIG. 22 illustrates one or more embodiments of the disclosure.

Turning now to FIG. 22, illustrated therein are one or more embodiments of the disclosure. The embodiments of FIG. 22 are shown as labeled boxes in FIG. 22 due to the fact that the individual components of these embodiments have been illustrated in detail in FIGS. 1-21, which precede FIG. 22. Accordingly, since these items have previously been illustrated and described, their repeated illustration is no longer essential for a proper understanding of these embodiments. Thus, the embodiments are shown as labeled boxes.

At 2201, an electronic device comprises an imager capturing one or more images of a subject engaging the electronic device. At 2201, the electronic device comprises an audio input receiving acoustic signals having audible frequencies from the mouth of the subject engaging the electronic device.

At 2201, the electronic device comprises one or more processors determining from the one or more images of the subject whether the mouth of the subject is oriented on-axis relative to the audio input or off-axis relative to the audio input. At 2201, the one or more processors adjust a gain of the audio input associated with a subset of the audible frequencies when the mouth of the subject is oriented off-axis relative to the audio input.

At 2202, the subset of the audible frequencies of 2201 is between 1,000 and 10,000 Hertz. At 2203, the subset of the audible frequencies of 2202 is between 1,000 and 5,000 Hertz. At 2204, the one or more processors of 2203 adjust the gain by at least five decibels (dB).

At 2205, the one or more processors of 2201 determine whether the mouth of the subject is oriented on-axis relative to the audio input or off-axis relative to the audio input by determining whether a central directivity vector of the acoustic signals is oriented toward the audio input. At 2206, the one or more processors of 2201 determine whether the mouth of the subject is oriented on-axis relative to the audio input or off-axis relative to the audio input by determining an azimuth of the head of the subject relative to the electronic device, a tilt of the head of the subject relative to the electronic device, and a geometric location of the head of the subject relative to the electronic device.

At 2207, the audio input of 2201 and the electronic device of 2201 are physically separate devices. At 2208, the electronic device of 2207 further comprises a user interface. At 2208, the one or more processors prompt the subject to speak from both a first geometric location relative to the electronic device and a second geometric location relative to the electronic device to determine whether the mouth of the subject is oriented on-axis relative to the audio input or off-axis relative to the audio input.

At 2209, the audio input of 2201 comprises a single microphone. At 2210, the one or more processors of 2201 adjust the gain the audio input associated with the subset of the audible frequencies only when the mouth of the subject is oriented off-axis relative to the audio input by at least a predefined rotation threshold. At 2211, the one or more processors of 2210 again adjust the gain the audio input associated with the subset of the audible frequencies when the mouth of the subject is oriented off-axis relative to the audio input by at least twice the predefined rotation threshold.

At 2212, a method in an electronic device comprises receiving, by an audio input of the electronic device, acoustic signals having audible frequencies from a subject while the mouth of the subject is oriented off-axis relative to the audio input. At 2212, the method comprises adjusting, by one or more processors operable with the audio input, a gain of the audio input for only a subset of the audible frequencies.

At 2213, the method of 2212 comprises receiving, by the audio input of the electronic device prior the receiving the acoustic signals when the audio input is a physically separate device from the electronic device, training acoustic signals from the subject while the mouth of the subject is oriented one of on-axis or off-axis relative to the audio input.

At 2213, the method comprises also receiving, by the audio input of the electronic device, other training acoustic signals from the subject while the mouth of the subject is oriented another of on-axis or off-axis relative to the audio input. At 2213, the method comprises determining, by the one or more processors from electronic signals corresponding to the training acoustic signals and the other training acoustic signals received from the audio input, a geometric location of the audio input relative to the electronic device.

At 2214, the method of 2213 further comprises, prior to the receiving the other training acoustic signals by the audio input while the mouth of the subject is oriented the another of on-axis or off-axis relative to the audio input, presenting, by the one or more processors on a user input of the electronic device, a prompt. At 2214, the prompt requests the subject to change one or more of an azimuth of the head of the subject relative to the electronic device, a tilt of the head of the subject relative to the electronic device, a geometric location of the head of the subject relative to the electronic device, or combinations thereof.

At 2215, the prompt of 2214 requests the subject to rotate the head to the right or left while delivering the other training acoustic signals. At 2216, the prompt of 2214 requests the subject to look away from the audio input while delivering the other training acoustic signals. At 2217, the prompt of 2215 requests the subject to move from a first geometric position relative to the electronic device to a second geometric position relative to the electronic device.

At 2218, an electronic device comprises an imager capturing one or more images of a subject engaging the electronic device. At 2218, the electronic device comprises an audio input receiving acoustic signals from the mouth of the subject engaging the electronic device.

At 2218, the electronic device comprises one or more processors determining from the one or more images of the subject whether the mouth of the subject is oriented on-axis relative to the audio input or off-axis relative to the audio input. At 2218, the one or more processors cause the audio input to beam steer a reception beam of the audio input toward the mouth of the subject when the mouth of the subject is oriented off-axis relative to the audio input.

At 2219, the one or more processors of 2218 determine from the one or more images of the subject whether the mouth of the subject is oriented on-axis relative to the audio input by detecting, in the one or more images of the subject, one or more of the eyes of the subject, nose of the subject, mouth of the subject, facial outline of the subject, or combinations thereof. At 2220, the one or more processors of 2218 further adjust a gain of the audio input associated with a subset of audible frequencies associated with the acoustic signals when the mouth of the subject is oriented off-axis relative to the audio input.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
   an imager capturing one or more images of a subject engaging the electronic device;
   an audio input receiving acoustic signals having audible frequencies from the mouth of the subject engaging the electronic device; and
   one or more processors determining from the one or more images of the subject whether the mouth of the subject is oriented on-axis relative to the audio input or off-axis relative to the audio input;
   the one or more processors adjusting a gain of the audio input associated with a subset of the audible frequencies when the mouth of the subject is oriented off-axis relative to the audio input, but only when the mouth of the subject is oriented off-axis relative to the audio input by at least a predefined rotation threshold defined by boundaries of the electronic device, such that the gain remains unadjusted until the mouth of the subject is oriented off-axis beyond the boundaries of the electronic device.

2. The electronic device of claim 1, wherein the subset of the audible frequencies is between 1,000 and 10,000 Hertz.

3. The electronic device of claim 2, wherein the subset of the audible frequencies is between 1,000 and 5,000 Hertz.

4. The electronic device of claim 3, the one or more processors adjusting the gain by between six and twelve decibels (dB).

5. The electronic device of claim 4, wherein the gain is between six and twelve decibels for all frequencies of the subset of the audible frequencies.

6. The electronic device of claim 1, the one or more processors determining whether the mouth of the subject is oriented on-axis relative to the audio input or off-axis relative to the audio input by determining whether a central directivity vector of the acoustic signals is oriented toward the audio input.

7. The electronic device of claim 1, the one or more processors determining whether the mouth of the subject is oriented on-axis relative to the audio input or off-axis relative to the audio input by determining an azimuth of the head of the subject relative to the electronic device, a tilt of the head of the subject relative to the electronic device, and a geometric location of the head of the subject relative to the electronic device.

8. The electronic device of claim 1, wherein the audio input and the electronic device are physically separate devices.

9. The electronic device of claim 8, the electronic device further comprising a user interface, the one or more processors prompting the subject to speak from both a first geometric location relative to the electronic device and a second geometric location relative to the electronic device to determine whether the mouth of the subject is oriented on-axis relative to the audio input or off-axis relative to the audio input.

10. The electronic device of claim 1, wherein the audio input comprises a single microphone.

11. The electronic device of claim 1, the one or more processors again adjusting the gain of the audio input associated with the subset of the audible frequencies when the mouth of the subject is oriented off-axis relative to the audio input by at least twice the predefined rotation threshold.

12. The electronic device of claim 1, the one or more processors further repeating the adjusting the gain as the subject moves in three dimensional space.

13. The electronic device of claim 1, the one or more processors further repeating the adjusting the gain while the subject is engaged in a videoconference.

14. The method of claim 1, further comprising determining the mouth of the subject is oriented off-axis relative to the audio input by using image analysis upon one or more images depicting a microphone.

15. A method in an electronic device, the method comprising:
    capturing, by an imager, one or more images of a subject engaging the electronic device;
    receiving, by an audio input of the electronic device, acoustic signals having audible frequencies from a subject while the mouth of the subject is oriented off-axis relative to the audio input; and
    adjusting, by one or more processors operable with the audio input, a gain of the audio input for only a subset of the audible frequencies by increasing a gain by at least six decibels (dB) above one kilohertz and decreasing the gain by the at least six decibels above five kilohertz only when the mouth of the subject is oriented off-axis by an axial amount exceeding physical boundaries of the electronic device.

16. The method of claim 15, further comprising:
    receiving, by the audio input of the electronic device prior the receiving the acoustic signals when the audio input is a physically separate device from the electronic device, training acoustic signals from the subject while the mouth of the subject is oriented one of on-axis or off-axis relative to the audio input;
    also receiving, by the audio input of the electronic device, other training acoustic signals from the subject while the mouth of the subject is oriented another of on-axis or off-axis relative to the audio input; and
    determining, by the one or more processors from electronic signals corresponding to the training acoustic signals and the other training acoustic signals received from the audio input, a geometric location of the audio input relative to the electronic device.

17. The method of claim 16, further comprising, prior to the receiving the other training acoustic signals by the audio input while the mouth of the subject is oriented the another of on-axis or off-axis relative to the audio input, presenting, by the one or more processors on a user input of the electronic device, a prompt requesting the subject to change one or more of an azimuth of the head of the subject relative to the electronic device, a tilt of the head of the subject relative to the electronic device, a geometric location of the head of the subject relative to the electronic device, or combinations thereof.

18. The method of claim 17, the prompt requesting the subject rotate their head to the right or the left while delivering the other training acoustic signals.

19. The method of claim 18, the gain being between the six decibels and twelve decibels for all frequencies of the subset of the audible frequencies.

20. The method of claim 17, the prompt requesting the subject to move from a first geometric position relative to the electronic device to a second geometric position relative to the electronic device.

* * * * *